United States Patent [19]
Andrea et al.

[11] Patent Number: 5,825,897
[45] Date of Patent: Oct. 20, 1998

[54] NOISE CANCELLATION APPARATUS

[75] Inventors: Douglas Andrea, Old Brookville; Martin Topf, Brooklyn, both of N.Y.

[73] Assignee: Andrea Electronics Corporation, Long Island City, N.Y.

[21] Appl. No.: 912,459

[22] Filed: Aug. 18, 1997

Related U.S. Application Data

[60] Division of Ser. No. 485,047, Jun. 7, 1995, which is a continuation-in-part of Ser. No. 339,126, Nov. 14, 1994, Pat. No. 5,673,325, which is a continuation-in-part of Ser. No. 968,180, Oct. 29, 1992, Pat. No. 5,381,473.

[51] Int. Cl.$^6$ .................................................... G10K 11/16
[52] U.S. Cl. ...................... 381/71.6; 381/71.7; 381/71.13
[58] Field of Search .................................. 381/71.6, 71.7, 381/71.13, 72, 74, 93

[56] References Cited

U.S. PATENT DOCUMENTS

| 3,170,046 | 2/1965 | Leale . |
| 4,672,674 | 6/1987 | Clough . |
| 5,138,664 | 8/1992 | Kimura et al. . |
| 5,732,143 | 3/1998 | Andrea et al. . |

FOREIGN PATENT DOCUMENTS 0390386 10/1990 European Pat. Off. .

*Primary Examiner*—Forester W. Isen
*Attorney, Agent, or Firm*—Frommer Lawrence & Haug LLP; Thomas J. Kowalski; I. Marc Asperas

[57] ABSTRACT

This invention relates to a method and an apparatus for reducing ambient noise for use with a headset or a boom headset attached to a boom microphone device or the like. The apparatus can include a sensor microphone to detect a background noise signal, a desired input audio transmission, and signal processing means for canceling the noise signals to create an inverted anti-noise signal within an acoustical waveguide located adjacent to the earphone of headset. The method for reducing noise according to this invention is provided by an open loop circuit allowing the input audio signal from an operator or caller to be transmitted to the user's ear without the disturbance of unwanted ambient noise. The method provides adjustments to the gain and/or phase of a noise signal for canceling the noise component detected, within an acoustical waveguide to produce a quiet zone for the desired audio speech to be transmitted. The apparatus can also include a noise cancellation microphone transmitter system having a first and second microphone arranged such that the first microphone receives a desired speech input and the background noise present in the vicinity of the speech, and the second microphone receives substantially only the background noise. The background noise from the second microphone is converted into a corresponding electrical signal and subtracted from a signal corresponding to the speech and background noise obtained from the first microphone so as to produce a signal representing substantial the speech.

5 Claims, 30 Drawing Sheets

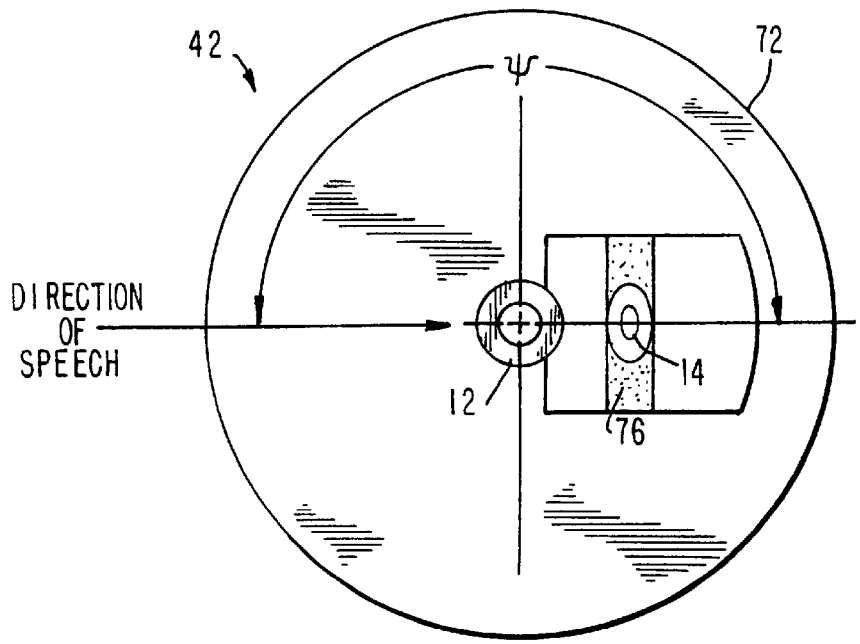
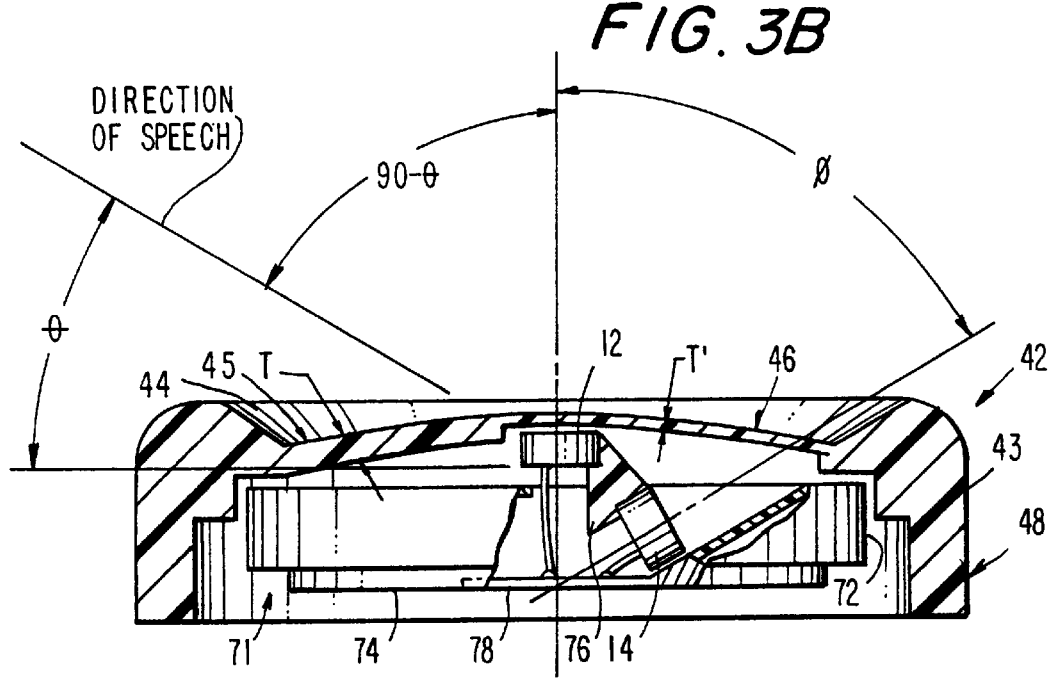

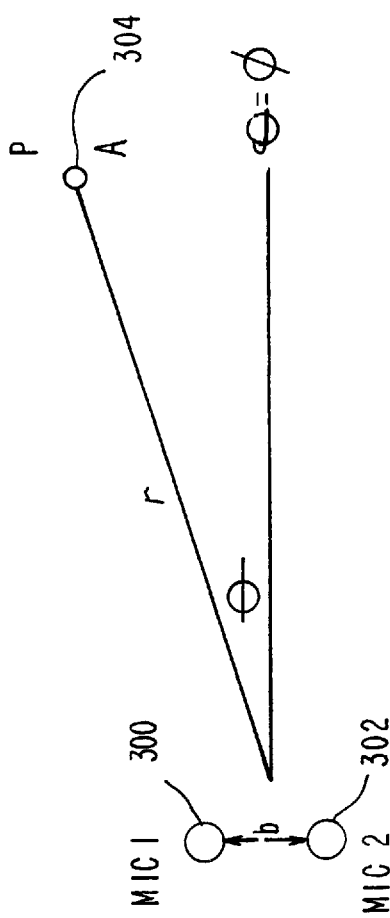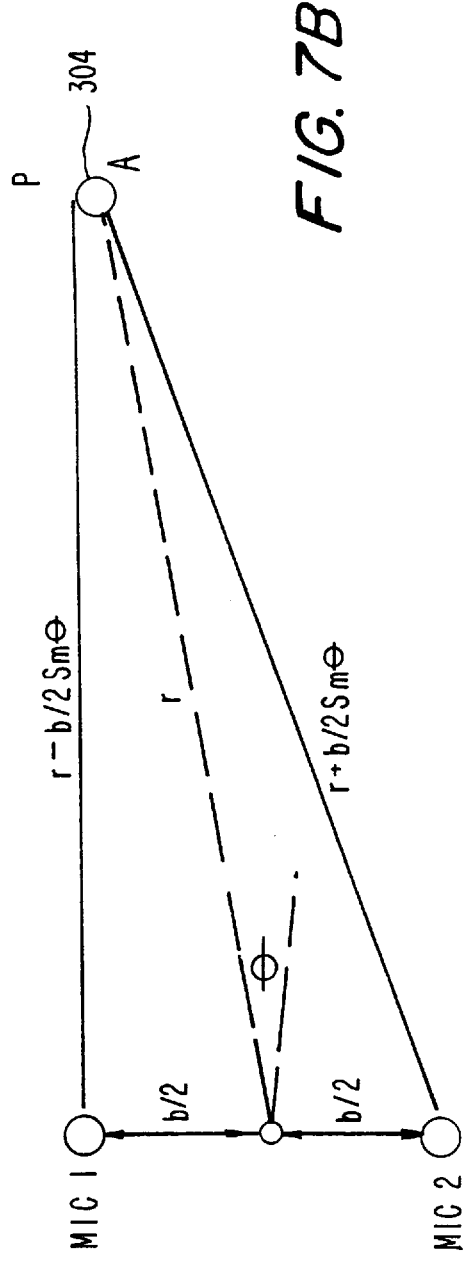

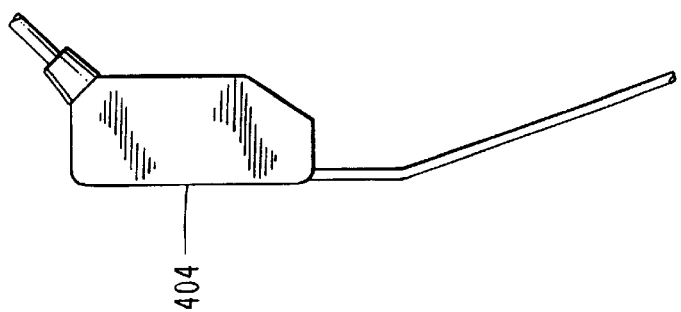
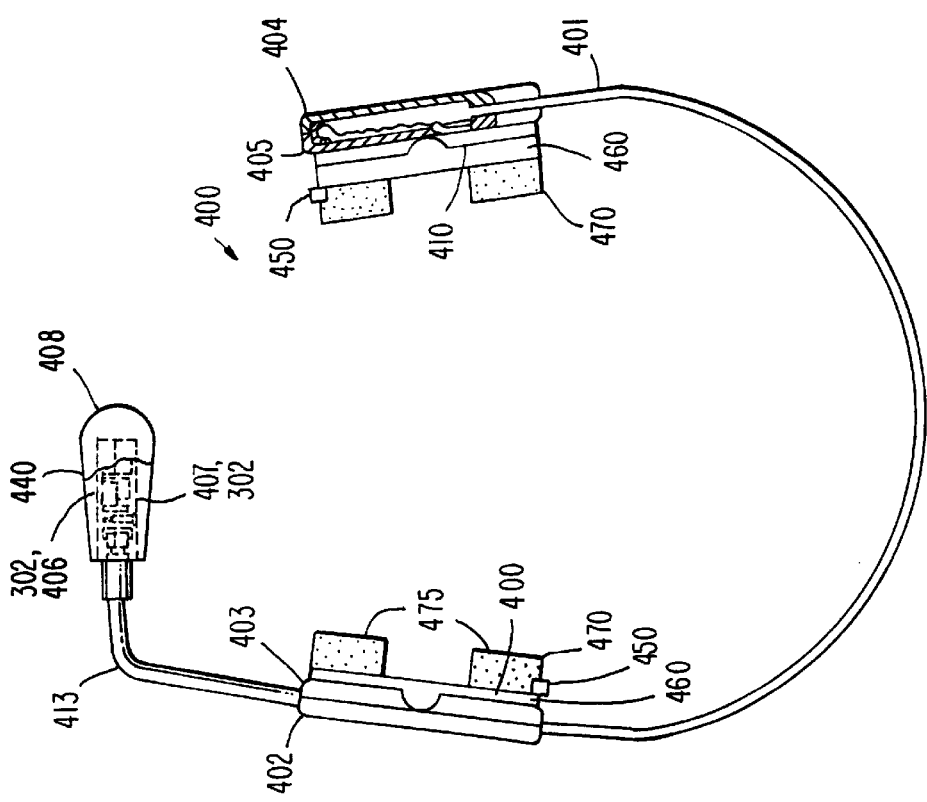
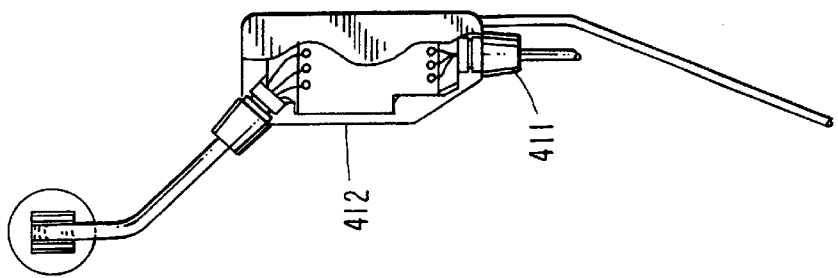
FIG.9E
FIG.9C
FIG.9D

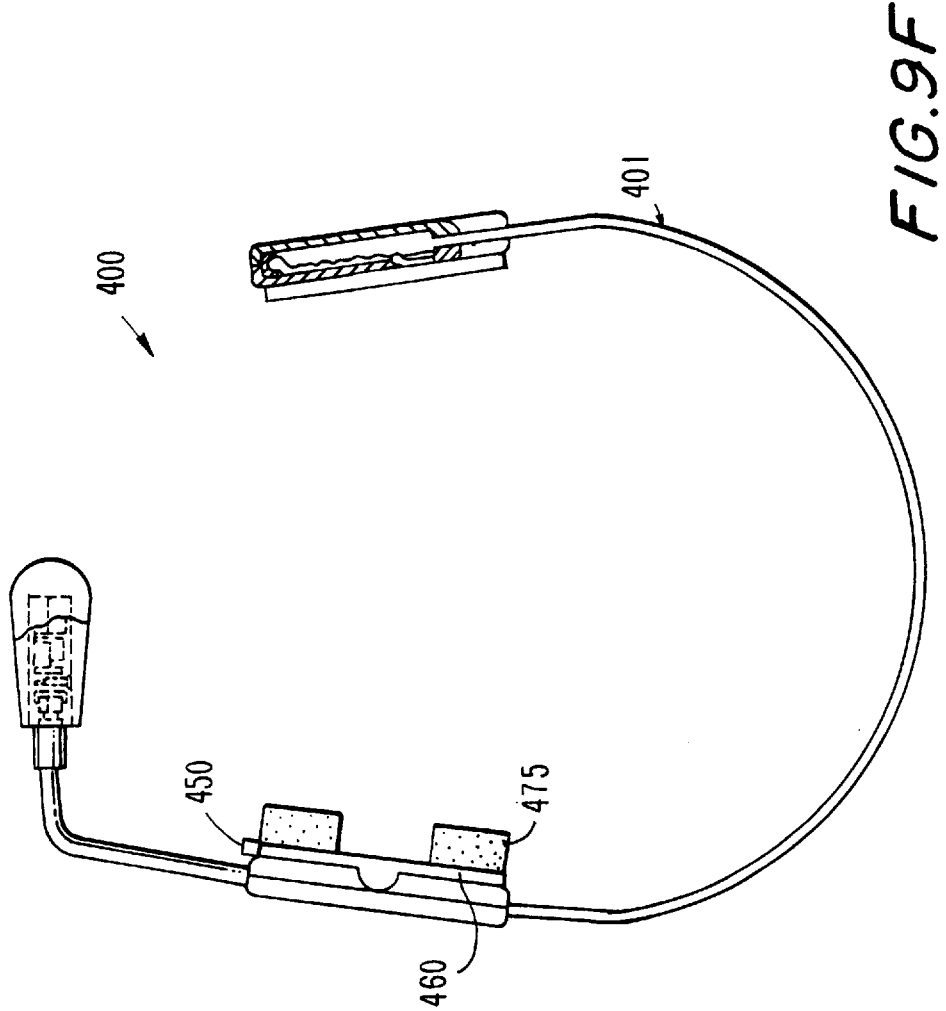

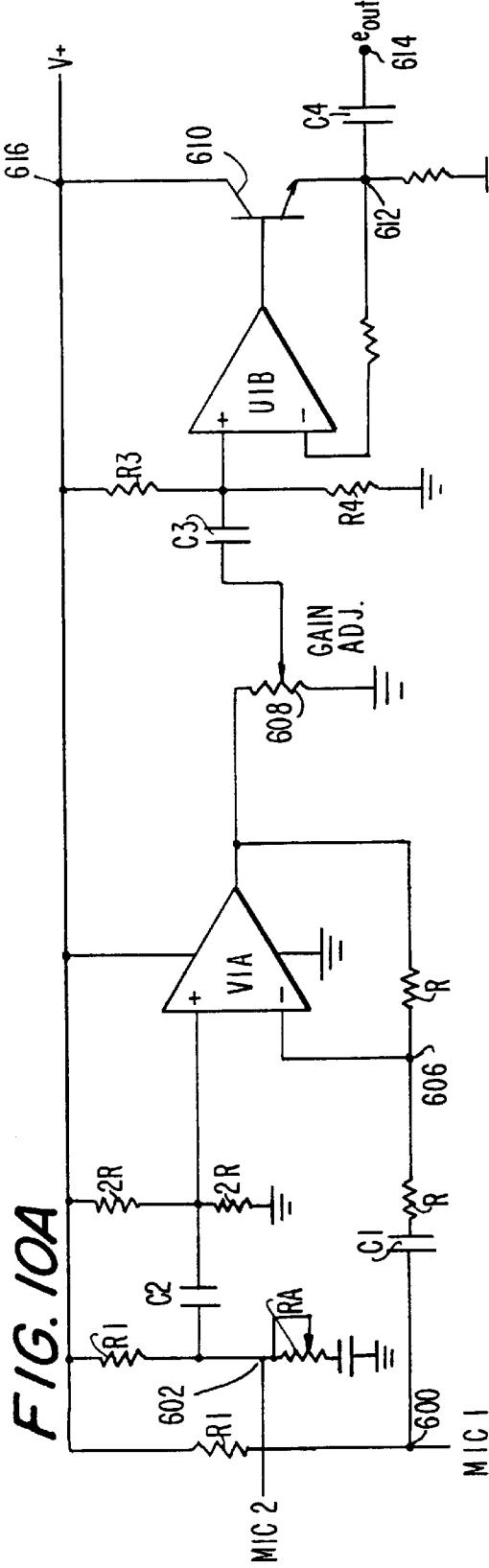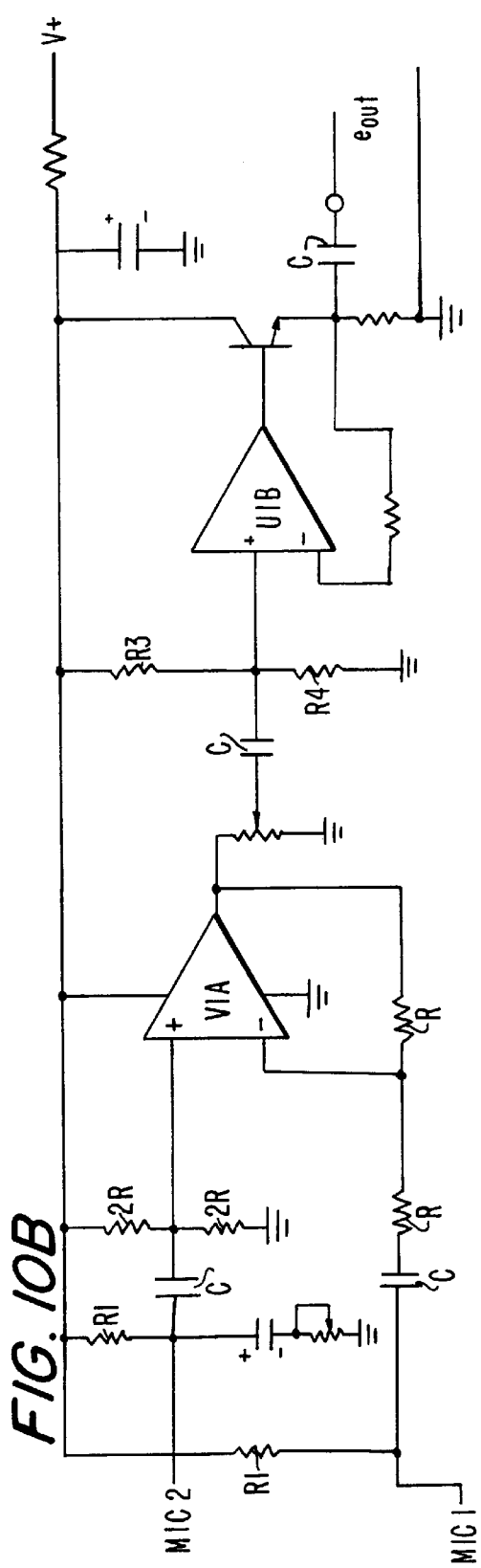
FIG. 10A
FIG. 10B

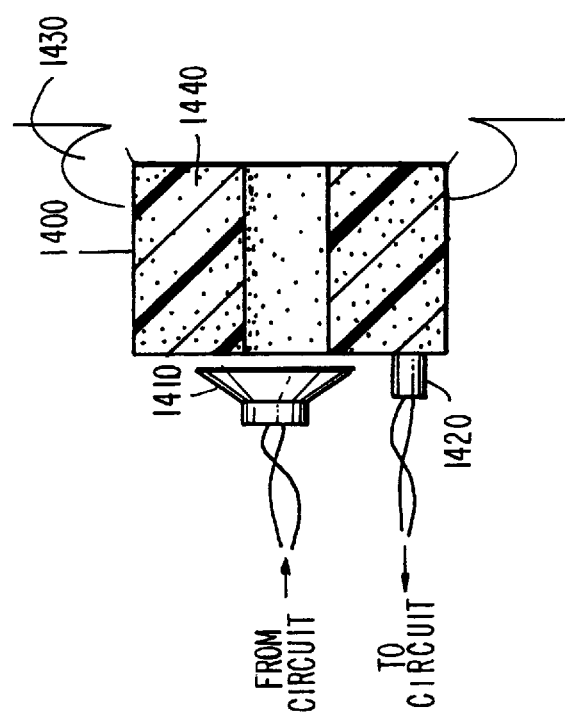
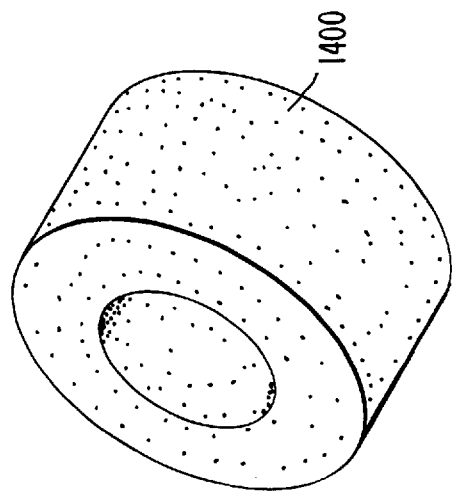

NOISE CANCELLATION APPARATUS

This application is a division of application Ser. No. 08/485,047, filed Jun. 7, 1995 which in turn is a continuation in part of application Ser. No. 08/339,126, filed on Nov. 14, 1994, now U.S. Pat. No. 5,623,325 which in turn is a continuation in part of application Ser. No. 07/968,180, filed on Oct. 29, 1992 now U.S. Pat. No. 5,381,473.

BACKGROUND OF THE INVENTION

1. Field of the Invention

The present invention relates to method and apparatus for noise canceling and noise reducing by attenuating unwanted ambient noise from reaching the eardrum and canceling background acoustic noise received from a boom microphone or directional microphone, when used with a headset or boom headset or the like.

The invention further relates to an active noise reduction system for use in headsets, particularly in the earphone vicinity where the system utilizes a sensor microphone to detect unwanted, background noise. This noise signal outputted by the sensor microphones is processed by electro-acoustical means to produce an inverted signal so that a quiet zone is created in an acoustical waveguide located between the output transducer, and the eardrum. Therefore the desired original audio signal is not disturbed by noise when transmitted to the ear of the user. The acoustical waveguide absorbs any sound returning to the microphone from the ear (preventing feedback) and deadens any sound returning from the microphone to the ear.

This invention also relates to a noise cancellation apparatus, for use with a telephone handset or a boom microphone or directional microphones or the like, where the system utilizes two microphones, a first microphone for receiving sound comprised of speech and background noise, and a second microphone for receiving sound comprised of substantially background noise, with the means for subtracting the second signal from the first signal.

The microphone in the noise cancellation system of the present invention utilizes a two terminal system, in which the output audio signal comprised of speech and the power support input used to drive the system are transmitted on one terminal and the second terminal is grounded.

The noise cancellation apparatus of the present invention also relates to a directional microphone used in a far-field microphone device having the ability to accept acoustical sounds in certain directions better than in other directions.

The noise cancellation and noise reduction system of the present invention may be enhanced by the inclusion of an automatic audio microphone transmission feature, a sidetone feature to transmit a portion of the signal to the earcup of the speaker, and a feature to convert an active noise cancellation microphone to a standard omni-directional microphone by removing voice microphone from the circuit, and the increasing the gain of the noise microphone amplifier. This enhancement allows all audio from external surroundings to be transmitted to the earcup of the speaker by increasing the sidetone channel gain without the addition of any other microphone elements..

2. Description of the Prior Art

As is to be appreciated, in numerous situations, the presence of background acoustic noise is undesirable. As an example, consider the situation in which an operator is attempting to conduct a telephone conversation from a telephone or such similar device located in a noisy area. In this situation, loud acoustic background noise is received by a microphone in the handset of the telephone and converted to an electrical signal which is supplied to the telephone(s) of the person(s) having the conversation with the operator and is converted thereat to an acoustic signal. As a result, the person to whom the operator is communicating constantly hears the loud background noise. Further, when the person is speaking, such speech is combined with the background noise and, as such, may be difficult for the other person(s) to understand. As a result, the operator may have to shout into the microphone of the telephone. Furthermore, the signal representing the background noise is also supplied from the microphone in the operator's handset to the speaker in the operator's handset as sidetone. Thus, the operator also constantly hears the background noise from the speaker in the operator's handset and, when the other person is speaking, may impair the understanding thereof.

As another example, consider the situation in which a pilot who is operating a helicopter or the like wishes to communicate with another person by way of radio frequency (RF) communication. In this situation, the pilot typically speaks into a so-called boom microphone or boom headset which is coupled to a radio transmitting/receiving device whereupon the speech is converted into RF signals which are transmitted to a second receiving/transmitting device and converted therein to speech so as to be heard by the other person(s). As with the above situation of a telephone located in a noisy area, the loud background noise from the helicopter is received and converted into an electrical signal by the boom microphone or headset device and thereafter supplied to the receiving device. As a result, the person(s) communicating with the pilot hears the loud background noise. This may be particularly annoying when the pilot leaves the radio transmitting/receiving device in the "ON", (the hot mike) position while operating the helicopter.

As yet another example, consider voice verification and/or recognition systems into which an operator must speak for access, for instance to a physical facility or, to operate a computer or automatic teller machine. Background noise can prevent access (no recognition or verification due to background noise) or can provide false access by false verification.

In an attempt to reduce background noise so as to improve performance of a telephone or a boom microphone or headset or the like located in a noisy environment or the like, pressure gradient microphones may be utilized. Basically, a pressure gradient microphone responds to the difference in pressure at two closely spaced points. When used in an environment where the pressure gradient of the background noise is isotropic, the electrical signal produced by the pressure-gradient microphone due to such background noise is effectively zero. However, in most actual situations, the pressure gradient of the background noise is not isotropic and, as a result, in these situations, the performance of the pressure-gradient microphone is adversely affected. Additionally, since voice or speech propagates in more than one direction, the electrical signal produced by the microphone which corresponds thereto is often degraded. Thus, even if a pressure gradient microphone is utilized in either a telephone handset or a boom microphone, the desired amount of background noise cancellation may not be sufficient and the performance may not be adequate.

Furthermore, since two opposite sides of a pressure-gradient microphone respond to acoustic pressure, as previously mentioned, the handset of an existing telephone would have to be substantially modified so as to enable these two sides of the microphone to respond to the acoustic pressure. Moreover, as a result of using such a microphone in a telephone handset, the electrical signals produced therefrom should be amplified. Thus, to replace the conventional microphone in a telephone handset of an existing telephone with a pressure-gradient microphone would typically necessitate replacing the handset with a new handset and, as such, would be relatively expensive.

As an alternative to using pressure-gradient microphones, an acoustic feed-back type system may be utilized. Such a system normally includes compensation filters which are used to equalize the transfer function of the output transducers. Since the characteristics of the speakers are tightly controlled by these filters, the cost of the filters is relatively high. As a result, such acoustic feed-back systems are typically relatively expensive.

Many microphones used with noise cancellation and noise reduction apparatus are inherently nondirectional or omnidirectional, such as the electrostatic, piezoelectric, magnetic and carbon microphones. With omnidirectional small microphones, at low frequencies there is sufficient diffraction of sound around the microphone so that diaphragm motion is insensitive to the direction of the sound. At high frequencies, and correspondingly shorter wavelengths, the microphone becomes acoustically larger and shows a preference for sound arriving perpendicular to the diaphragm. Thus, the smaller in size of the microphone, the higher in frequency its behavior remains omnidirectional. Hence, the omnidirectional microphones are small compared to the wavelength and the microphone case shields the rear side of the diaphragm from receiving certain sound waves at different angles. As a result, these prior art microphones are referred to as pressure microphones since pressure is a scaler, and not a vector quantity. Thus, a directional microphone response able to increase the sensitivity of sound in a far-field region from a variety of directions is desired for a microphone device in an active noise cancellation system. That is, to achieve a directional microphone response by adding the outputs of the omnidirectional pattern and bidirectional or "figure-eight" pattern, and then simply adjusting the amplitude and phase of the summed output signal to produce the desired pattern. The figure-eight pattern is also known as a cosine pattern and is mathematically expressed a p=COS θ, in polar coordinates. In directional microphones, distance is a factor. The distance factor measures how much farther away from a source a directional microphone may be used, relative to an omnidirectional pattern, and still preserve the same ratio of direct to reverberant pickup. Thus, the prior art has failed to provide a directional microphone in an active noise reduction apparatus based on the omni-directional patterns and the cardioid patterns where the sound pressures arriving at a determined point are added vectorially.

In devising the circuitry for an active noise cancellation apparatus for use with a boom microphone device or a directional microphone device comprising at least two microphones, it is known to use a three terminal microphone configuration. That is, a noise cancellation system having two or more microphones connected to an amplifier, for example, requires circuitry having three terminals: a power supply input terminal, an audio signal output terminal, and a ground terminal. In an effort to reduce the complexity and cost of the noise cancellation system utilized in the microphone, or boom microphone or the like which optionally may be used with a headset of the noise reduction apparatus, a two terminal microphone configuration is desired. It is desired to have a microphone configuration where the DC voltage supplied from a power supply is inputted on the same terminal as the AC audio signal outputted from the microphones, whereby the AC signal is superimposed on the DC signal. Thus, the prior art has failed to provide a two terminal microphone configuration for use in an active noise cancellation apparatus, where the power and signal are superimposed on the first terminal and the second terminal is grounded.

In yet a further attempt to reduce background noise so as to improve the intelligibility of electro-acoustic communication using headsets with a microphone, a technique has been developed, called active noise reduction that utilizes a sensor microphone placed between the speaker and the ear in the sound field of the speaker, and which senses the background noise and programs audio. With this active type headphone device, a negative feedback loop is used whereby the electrical signals converted from the external noises by a microphone unit are fed back in a reverse phase for reducing the noise in the vicinity of the headphone unit. A feedback circuit utilizing a closed loop system as shown in the prior art provides a "quiet zone" between the speaker and the ear which eliminates the background noise. This is because in a noisy environment, the ear will detect not only the output of the speaker, but also the background noise.

Reference is made to the following documents providing a closed loop active noise reduction system, which documents are hereby incorporated by reference:

U.S. Pat. No. 2,972,018 to Hawley et al.
U.S. Pat. No. 3,098,121 to Wadsworth
U.S. Pat. No. 4,833,719 to Carme et al.
U.S. Pat. No. 5,138,664 to Kimura et al.
Japanese Patent Abstract No. 3-169199 to Saeki.

The above-referenced patents illustrate a variety of noise canceling devices. For instance, Hawley et al. relates to a noise reduction system for earphones having a plastic casing located between the speaker and the microphone; Wadsworth provides an earphone having a microphone located on top of the headband; Carme et al. is directed to an earphone having a hollow annular part located between the speaker and the microphone; Kimura et al. calls for a noise reduction headphone having a cup member located between a speaker and a microphone; and Saeki relates to a noise canceling headphone having a microphone located between two oppositely facing loudspeakers.

However, there exist various disadvantages in the conventional active noise reduction systems. The prior active noise cancellation systems, for instance, utilize closed loop-type circuits governed by the associated equations:

$$P = S\left(\frac{H_1 H_2 + H_2}{1 + BH_1 H_2}\right) + N\left(\frac{1}{1 + BH_1 H_2}\right)$$

where
P=output
S=standard audio signal
$H_1$=high pass filter
$H_2$=speaker at headset
N=noise component
B=variable gain/ phase control The conventional closed loop noise reduction system is not ideal as a very large direct transmission gain (1+BH1H2) is required in order to reduce the noise component (N) to zero at the output (P). This system suffers from the problem of instability. This creates drawback of oscillation, i.e., squealing due to the unstable loop conditions caused by variations in the transfer function of the speaker, feedback microphone and acoustic cavity containing these elements and user headgear. The degree of noise cancellation generated by the conventional closed loop noise reduction device, at any frequency, is directly related to the direct transmission gain at that frequency. However, the higher the gain the more susceptible the device is to instability.

The conventional active noise reducing headphone device also has the drawback that when mechanical vibrations such as impact, frictional induced vibrations from connecting cords, user jaw movement induced vibrations etc., are transmitted to the noise feedback microphone, these vibrational noises are converted to electrical signals by the microphone. These signals are amplified and cause instability and other non-linear effects, for example, audio interruption, loud noises or pressure surges.

Another drawback of conventional active noise reducing headphone devices is the complexity added to the device to avoid canceling the desired audio signal, which signal is inputted as an electrical signal. The desired audio signal (S) of the conventional device is input into two summing nodes to create the signal transmitted to the user's ear. The first summing node adds the negative feedback microphone signal to the desired input audio signal. But, in a conventional closed loop feedback device, the signal feedback from the microphone contains the desired audio signal as well as the ambient noise signal which is desired to be canceled. This feedback signal is subtracted from the desired input audio signal to create the anti-noise signal, with zero desired audio signal content. Then, a second summing node is used to add the desired audio signal back into the loop so it can be transmitted to the output transducer. This method of generating the desired audio signal adds complexity and cost to the conventional noise reducing device. The additional summing node processing in the conventional device also increases chances of creating distortion in the desired audio signal as well as increasing the possibility of instability.

In addition, various other prior art headphone configurations have been developed for creating an active noise reduction device, where the input and output transducers are positioned in relation to the ear, such as the following three documents, which are incorporated by reference:

U.S. Pat. No. 5,134,659 to Moseley.
U.S. Pat. No. 5,117,461 to Moseley.
U.S. Pat. No. 5,001,763 to Moseley.

Moseley ('659) relates to a noise canceling system for headphones having a baffle, two speakers, and two microphones wherein the baffle serves to impede noise from traveling directly from a noise source to the input transducer by forcing the noise to travel a longer distance around the baffle and through a foam barrier. Moseley ('461) is directed to an electroacoustic function including noise cancellation for use with headbands having a microphone mounted on the headband to face in same direction of the ear canal. Moseley ('763) relates to a noise cancellation system for headbands having a speaker, microphone, and a baffle.

Thus, in general, the Moseley patents are concerned with the location of the speaker, being the output transducer, and the microphone, which is input transducer. In fact, the patents require that the speaker and microphone be in the same plane or substantially aligned in the same plane. Also, the patents teach that the processed signal output is substantially in the same time domain as the original acoustic wave, that is the signal is in phase.

In contrast to the Moseley patents, the present invention is not per se concerned with the alignment of the speaker and microphone in the same plane (although such alignment need not be explicitly excluded). The output transducer and microphone utilized in the open loop active noise reduction of the present invention may be perpendicular, tangential, or in any other location out of the same plane (as well as in the same plane). The present invention provides a noise reduction system having the capability to transmit the original input audio signal to the speaker without the readdition of the input audio signal. This is because the sensor microphone, which is the control action of the open loop, is so disposed from the audio signal, that the audio signal is not detected by the pickup or sensor microphone. That is, in the open loop system of the present invention, the original desired audio signal is transmitted to the speaker independent of the ambient noise detected by the microphone. In addition, in the present invention an acoustical material can be located between the output transducer and the eardrum of the user to create an acoustical waveguide for the transducer by coupling the audio signal to the ear of the user. The acoustical material located between the output transducer and microphone acts as an acoustic filter to decrease the open loop gain by placing an acoustical impediment in the path of the pickup microphone and the output transducer. The acoustical material isolates the desired original inputted audio signal from the noise detected and canceled by the pickup microphone. The background noise signal detected by the pick-up microphone is inverted through electric-acoustical processing means producing an anti-noise signal, which signal is transmitted to the acoustical waveguide to create a quiet zone. This quiet zone is located between the output transducer and the eardrum of the user.

Thus, the prior art has failed to provide a relatively low-cost means for reducing background noise to an acceptable level for use with communication systems or the like, and a cost-effective means for enabling existing audio communication systems to reduce background noise to an acceptable level.

OBJECTS AND SUMMARY OF THE INVENTION

An object of the present invention is to provide an active noise cancellation apparatus and an active noise reduction apparatus to create a noise reducing system which overcomes the problems associated with the prior art.

More specifically, it is an object of the present invention to provide an active noise cancellation apparatus and active noise reduction apparatus which reduce background noise to an acceptable level.

Another object of the present invention is to provide noise reduction apparatus for use with a headset device and boom microphone or to provide a noise cancellation microphone device or the like.

It is still another object of the present invention to provide noise reduction and cancellation apparatus and an active noise reducing system as aforementioned which is relatively inexpensive.

It is yet another object of the present invention to provide a relatively low-cost noise reduction and cancellation apparatus for use with telecommunication systems which is operable with standard available on-line power.

Another object of the present invention is to provide an enhanced active noise cancellation and noise reduction headset by adding a talk thru feature, which enables the user to hear the microphone audio signals as well as the external audio from the surrounding environment, without the physical addition of any other microphone elements. The object of the present invention is to have an active noise cancellation and noise reduction headset where all the audio from external area is transmitted to the earcup of the speakers by increasing the gain of the sidetone channel. This active noise cancellation microphone of the present invention is converted to a standard omni-directional microphone by removing the voice microphone from the electronics and increasing the gain of the noise microphone amplifier.

A still further object of the present invention is to provide a relatively low-cost noise cancellation apparatus which is readily adaptable to handsets of existing communication systems and which is operable with standard available on-line power.

A yet further object of the present invention is to provide a relatively low-cost noise reduction apparatus for use with audio communication systems which enables the user to selectively amplify a received signal or, which may be used in a boom microphone with a headset or, which may be used as a noise canceling microphone.

In many applications as described herein, microphones with other-than-omnidirectional characteristics are desired. Such microphones reject signals from certain directions and thus yield an improvement of the signal-to-noise ratio. The directional microphones based on summation scheme, which is that of the present invention, may depend on the algebraic combinations of the sound pressure signals with phase differences which are exclusively due to the electronics of the system. As opposed to gradient-type microphones, the directivity of such microphones is dependent on the ratio of linear dimensions to wavelength.

When two or more microphones are fed into the same amplifier, it is possible that signals from a sound source at distance from the microphones may arrive at the microphones 180° out of phase, canceling each other. Therefore, it is an object of the present invention to ensure the omni-directional and directional microphones are phased properly.

It is also an object of this invention that the first and second microphones arranged at a predetermined angle and/or distance with subtraction apparatus disclosed herein can also be used in the area of ambient noise cancellation for microphones in acoustic surveillance or telemetry or even directional microphones such as directional microphones with sidelobes.

Accordingly, is an object of the present invention to provide a low cost microphone for use in a noise cancellation system with other-than-omnidirectional characteristics.

It is a further object of the present invention to provide a controllable variety of directivity patterns with a microphone based on the magnitude and phase lobe construction.

It is yet another object of the present invention to provide a directional microphone by adding vectorially at a determined point the sound pressures arriving at that point from all simple sources.

It is still another object of the present invention to provide a two-terminal microphone system, including the directional microphone as aforementioned, in an active noise cancellation environment, which allows the audio output signal to be superimposed on the voltage input signal at the same terminal.

Another object of the invention to provide a novel active noise reduction apparatus for use in headsets due to its simplicity and low cost circuitry by positioning elements in an open loop system.

It is object of the present invention to provide a noise reduction apparatus in which the ambient noise is attenuated in a regular manner without being degraded by mechanical or vibration induced microphone signals.

It is another object of the present invention to provide an active noise reducing system comprised of a headset, handset or the like with a boom microphone or directional microphone or the like which is unconditionally stable due to its open loop configuration.

It is further object of the present invention to reduce the power required by the noise reduction apparatus by coupling the electro-acoustic transducer efficiency.

It is further object of the present invention to reduce the complexity and/or cost of the active noise reduction circuit by employing a method of combining the desired audio signal and the anti-noise signal to the output transducer in a single summing node.

It is further object of the present invention in a noise reducing system to reduce anti-noise processing induced distortion of the desired electrical input signal which is converted to an acoustic signal and transmitted to the ear in a noise reduction system.

Another object of the noise reduction apparatus involves a sensor or pickup microphone placed behind or in front of the output transducer, and outside of the sound field and the plane of the speaker, so that the microphone detects only the background noise by utilizing of the acoustical material, which performs dual functions.

It is a further object of this invention to provide an acoustical material as an acoustic filter when positioned over a microphone, and as an acoustic waveguide when placed between the output transducer and ear of the user.

It is the microphone that is the control action of the system, the microphone is independent of the inputted audio signal, the desired output. A resilient acoustical waveguide is preferably positioned between the speaker/microphone and the ear to create a quiet zone. This waveguide is preferably more than just the usual rubber sponge which is commonly provided on earphones for comfort purposes. One type of such material is called "Slo-Flo" foam and it is of such a density and construction so as to define a noise-free response and to deaden any sound reflections returning to the microphone, acting as an acoustical filter, from the listener's face and/or ear; whereas the prior art uses a negative feedback of the signal from the microphone, no such feedback is produced in the present invention. Instead, an open-loop arrangement is utilized, wherein there is no need to add another audio signal, but the original input audio signal is transmitted to the speaker, as the signal has not been disturbed by the open loop system.

It is important to understand the distinctions between a conventional closed-loop reduction apparatus and the novel open loop reduction apparatus of the present invention.

An open loop system of the present invention is one in which the control action is independent of the output or desired result. A closed loop system is one in which the control action is dependent on the output. The key term in these definitions is control action. Basically, the term refers to the actuating signal of the system, which in turn represents the quantity responsible for activating the system to produce a desired output. In the case of the open loop system, the input command is the sole factor for providing the control action, whereas for a closed loop system, the control action is provided by the difference between the input command and the corresponding output.

To complete the comparison of the closed loop versus open loop operation, certain performance characteristics of each system is as follows: open loop systems have two outstanding features, namely, the ability to perform a function being determined by calibration and simplicity in construction, for instance because the problems of instability are not incurred. For closed loop systems, a noteworthy feature is the ability to faithfully reproduce the input owing to the feedback, since the actuating signal is a function of the deviation of the output from the input; this control action forces the actuating signal almost at zero. A major disadvantage of this feedback factor is that it is responsible for one of the greatest difficulties in using a closed loop systems, namely the tendency to oscillate.

The active noise reduction apparatus as well as the noise cancellation apparatus can be used in any telecommunication systems that are used in flight (e.g., helicopter or airplane) or in other settings such as telephones, or voice recognition and/or verification systems for instance, for access to a physical facility or to a computer (either via direct or indirect interface or via telephone lines) or to an automatic teller machine or, in other recognition and/or verification systems.

The noise cancellation apparatus comprises: a housing having first microphone means for receiving a first acoustic sound composed of speech originating from an operator operating said apparatus and background noise, and for converting said first acoustic sound to a first signal, and second microphone means arranged at a predetermined angle φ in close proximity with respect to said first microphone means for receiving a second acoustic sound composed of substantially said background noise and for converting said second acoustic sound to a second signal; and means for subtracting the second signal from the first signal so as to obtain a signal representing substantially said speech. The two terminal transducer for use in the noise cancellation apparatus for reducing background noise comprises: a plurality of microphones connected to an amplifier means of the noise cancellation apparatus; the amplifier means for receiving audio signals from the microphone having a first terminal and a second terminal wherein the second terminal is grounded; a voltage means inputting a DC signal on the first terminal; a transistor means connected to the first terminal for receiving an AC signal from the microphones; means for superimposing the AC signal onto the DC signal on the first terminal; means for filtering the AC signal from the DC signal, so the DC signal powers the amplifier means; and means for outputting the AC signal generated by the microphones at the first terminal. The directional microphone for use in obtaining a far-field response when speaking into a boom microphone of an active noise cancellation apparatus, which accepts sounds in a variety of directivity patterns comprises: a housing having an array of spaced microphones means for receiving acoustics signals and outputting electrical signals having a spaced separation between the microphones; a pressure sound source inputted into the housing as a sinusoidal sound wave having a magnitude and phase which intersects the microphones at a predetermined distance to form an angle; means for calculating the distance from each microphone to the sound source; a summing channel for adding the output signals of the array of microphones to obtain a sum output signal; a signal processing means to produce an acoustic signal representing only speech from the sum output signal; and means for adjusting the magnitude of the sum signal to produce the desired response pattern. The open-loop active noise reduction apparatus for reducing ambient noise in the vicinity of the eardrum comprises; a housing for receiving an input and to signal; an output transducer located in the housing; an input transducer for detecting and reducing ambient noise located not in substantially the same plane as the output transducer; an open-loop signal processing means to reduce the ambient noise detected by the input transducer; means for transmitting the input audio signal to the eardrum without disturbance of the ambient noise; an acoustic means to isolate the output transducer from the input transducer for channeling the input audio signal representing substantial speech between the output transducer and the eardrum, wherein a quiet zone is created to isolate sound transmitted from the input transducer. The open loop noise reduction system for use with an active noise cancellation apparatus comprises; a pick-up microphone for detecting noise signals to convert to electrical signals; a speaker located in the headset having a acoustic means; an audio transmission signal; means for electrically rejecting vibrations of the electrical signal; a variable gain/control means for adjusting the noise signal; means for filtering out mechanical vibration induced low frequency disturbance from reaching the speaker; a summing node to combine the anti-noise signal and the noise signal to produce a quiet zone in the acoustic means; means for transmitting the audio signal to the speaker; and means for maintaining phase agreement between the noise signal and the anti-noise signal of the speaker.

An open loop active noise reduction apparatus for reducing ambient noise in the vicinity of the eardrum, comprising: a housing for receiving an input audio signal; an output transducer located in the housing; an input transducer for detecting and reducing ambient noise located in the housing; a open loop signal processing means to reduce ambient noise detected by the input transducer; means for transmitting the input audio signal without disturbance of the noise to the eardrum; an acoustic means to isolate the output transducer from the input transducer for channeling the input audio signal representing substantial speech between the output transducer and the eardrum and creating a quiet zone to isolate sound transmitted from the input transducer.

An active noise cancellation and noise reduction system for use in a headset for transmitting audio signals from microphones and for receiving external audio from a surrounding environment comprising: a first microphone means having a first switch means having a noise canceling mode and a first talk thru mode and a second microphone means; a microphone amplifier means connected to the microphones by a second switch means; an audio microphone transmission means for connecting the amplifier means when the first switch means and the second switch means are operating in the noise canceling mode, wherein the microphone transmission means is bypassed when the first switch means and the second switch means are in a talk-thru mode; a transmission gate for transmitting the audio signal from both microphone means to a buffer amplifier when the first switch means and second switch means are in the noise canceling mode, wherein the transmission gate is disabled when the second switch means is in the talk thru mode; the buffer amplifier means for transmitting the audio signal received from the transmission gate to an audio system and to a scaling amplifier when the first switch means and second switch means are operating in the noise canceling mode; the buffer amplifier means for directly outputting the audio signals received by the microphone amplifier means when the first switch means and second switch means are operating in the talk thru mode; the scaling amplifier having a third switch means having a noise canceling mode and a talk-thru mode, provides a sidetone signal to an earcup of a speaker transmitted from both microphone means and from the external audio when all the switch means are operating in the noise canceling mode; the scaling amplifier having a gain control, wherein the gain control is increased when all the switch means are operating in the talk thru mode to increase the sidetone signal to a speaker; active noise reduction system receives and outputs the sidetone signal to the speaker in the headset.

Other objects, features and advantages according to the present invention will become apparent from the following detailed description of the illustrated embodiments when read in conjunction with the accompanying drawings in which corresponding components are identified by the same reference numerals.

BRIEF DESCRIPTION OF THE DRAWINGS

FIG. 3A is a front plan view of the receiver portion of the telephone of FIG. 1;

FIG. 3B is a side elevational view of the receiver portion of the telephone of FIG. 1 with the top removed;

FIGS. 7A and 7B are schematic diagrams to which reference will be made in explaining the operation of the present invention;

FIGS. 9A, 9B, 9C, 9D, 9E and 9F illustrate boom microphone and headset embodiments of the present invention (FIGS. 9A and 9B each showing an embodiment having particular placement of the microphone; FIG. 9C showing an overview of the headset, having active noise reduction apparatus FIGS. 9D, 9E, and 9F showing side views of the boom microphone) and FIG. 9F shows a preferred embodiment of the active noise reduction apparatus utilized in a headset;

FIGS. 10A and 10B are schematic diagrams of the noise reduction apparatus of FIG. 8;

FIGS. 23A and 23B illustrate a perspective view and side view of the acoustical waveguide of the present invention;

DETAILED DESCRIPTION OF THE PREFERRED EMBODIMENTS

Figure 1:
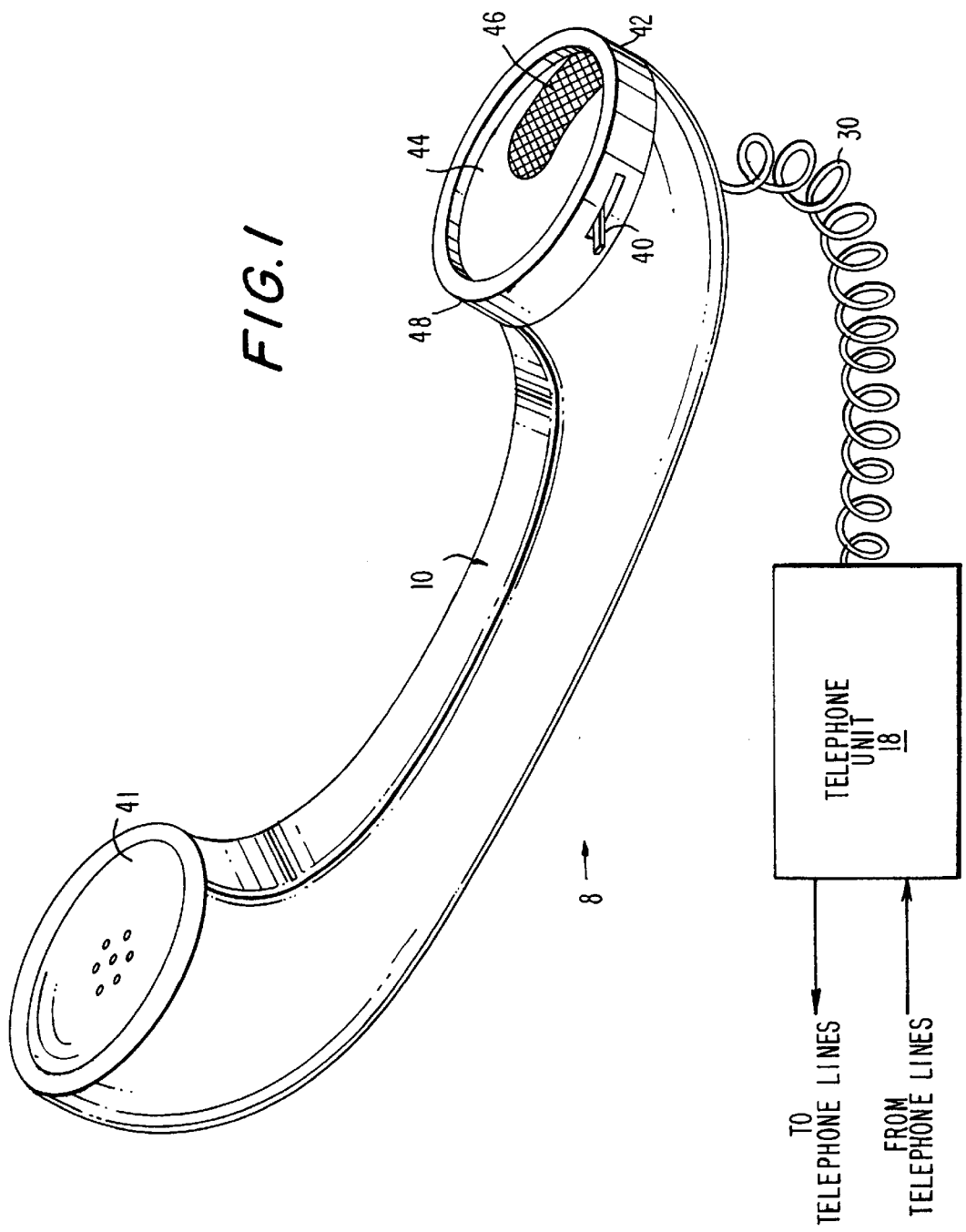
FIG. 1 illustrates a telephone having a noise cancellation apparatus according to an embodiment of the present invention.

FIG. 1 illustrates a telephone 8 which utilizes a noise reduction apparatus in accordance with an embodiment of the present invention. As shown therein, the telephone 8 generally includes a handset 10, having a speaker portion 41 and a receiver portion 42, and a telephone unit 18 which may be coupled therebetween by way of a telephone cord 30. Alternatively, the telephone may be a cordless type telephone and, as such, the handset 10 is coupled to the telephone unit 18 by way of RF waves. The receiver portion 42 includes first and second microphones 12 and 14, respectively, (FIG. 2), a switch 40 for adjusting the volume of a signal supplied to the speaker portion 41, and a cap 48 having a recessed portion 44 and a mesh portion 46.

Figure 2:
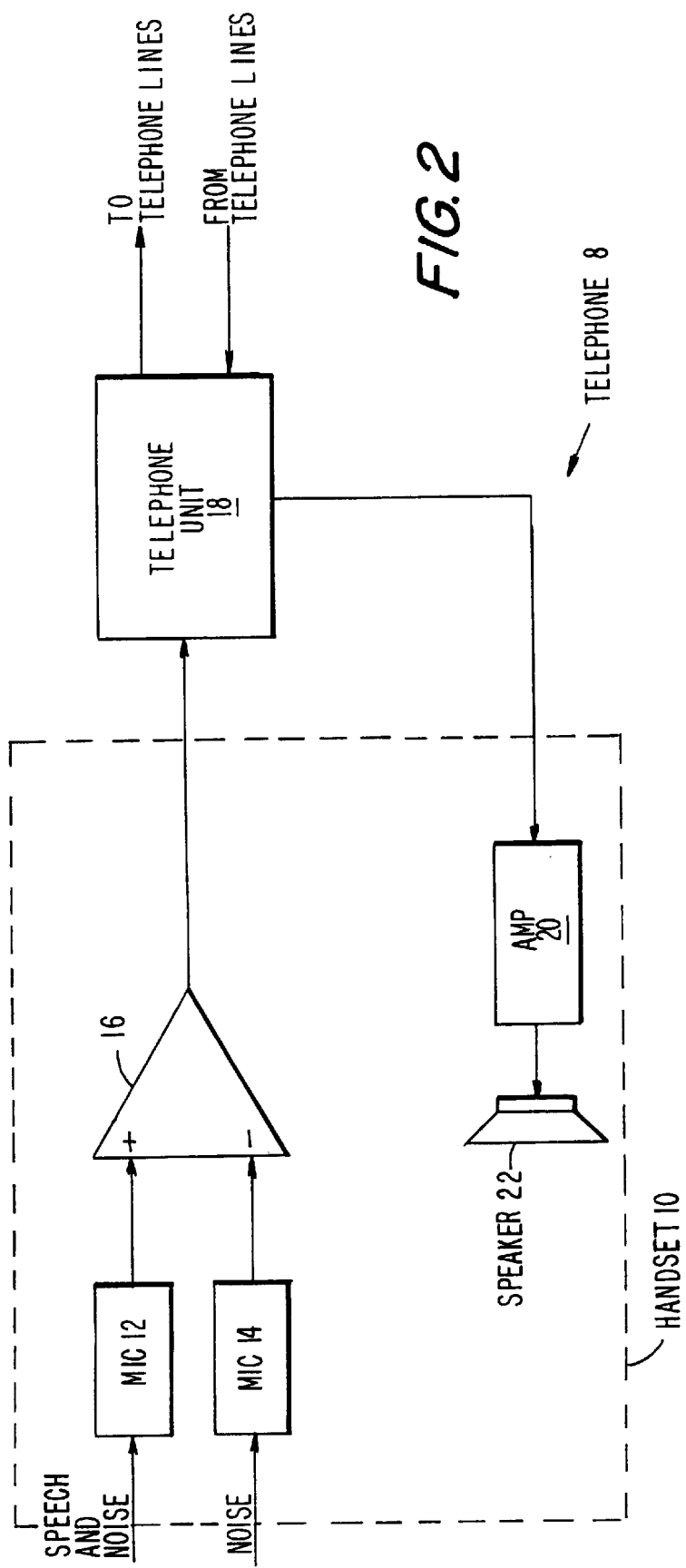
FIG. 2 is a block diagram of the noise cancellation apparatus used in the telephone of FIG. 1.

FIG. 2 illustrates the telephone 8 in block diagram form. As shown therein, the handset 10 generally includes first and second microphones 12 and 14, respectively, a subtracting device 16, which in a preferred embodiment is an operational amplifier ("op-amp"), an amplifier 20, which is preferably an op-amp, and a speaker 22. The first and second microphones 12 and 14, respectively, op-amp 16 and amplifier 20 are preferably contained within the receiver portion 42 (see FIG. 1).

Acoustic signals composed of speech or the like and background noise are supplied to the first microphone 12 and converted therein into a corresponding electrical signal which is thereafter supplied to the plus terminal of the op-amp 16. The background noise is supplied to the second microphone 14 and converted therein into a corresponding electrical signal which is thereafter supplied to the minus terminal of the op-amp 16. The op-amp 16 is adapted to subtract the noise signal from the second microphone 14 from the speech and noise signal from the first microphone 12 and to supply therefrom an electrical signal representing substantially the speech to the telephone unit 18 whereupon the speech signal is transmitted therefrom through the telephone lines to a desired telephone or telephones. The output signal from the op-amp 16 is also combined in the telephone unit 18 with a received signal from the telephone lines and supplied to the amplifier 20. The op-amps 16 and 17 are preferably relatively low-power integrated circuits (IC's), such as complementary metal oxide semiconductors (CMOS), and may be constructed from either one or more CMOS IC chips. Although not shown in FIG. 2, amplifier 20 may be selectively set by use of the switch 40 (FIG. 1) by the operator so as to adjust the amplification of the received signal to a desired level. The amplified signal from the amplifier 20 is supplied to the speaker 22, whereupon the amplified signal is converted into an acoustic signal so as to be heard by the operator.

FIGS. 3A and 3B illustrate two views of the receiving portion 42, in which the cap 48 is removed in the view of FIG. 3A. As shown therein, the receiving portion 42 generally includes a housing 74, a circuit board assembly 78, the first and second microphones 12 and 14, respectively, and the cap 48. The first and second microphones 12 and 14, respectively, which are preferably electric microphones or similar such microphones, are arranged or positioned as hereinafter described. These microphones are held in place or secured by a holding member 76 which, for example, may be constructed of a foam-like material, which, in turn, is secured to the housing 74. The respective outputs from the first and second microphones 12 and 14 are supplied through respective wires (not shown) to the op-amp 16 which is contained on the circuit board assembly 78 which, in turn, is attached to the housing 74. As hereinafter more fully described, the circuit board 78 may contain additional circuit elements for processing the signals received from the first and second microphones and for amplifying signals for supply to the speaker 22 (FIG. 2). A cover 72 may be utilized which is attached to the housing 74 by use of adhesives or the like or alternatively may be sonically welded together. The cover 72 and the housing 74 with the circuit board assembly 78, holding member 76 and the first and second microphones 12 and 14 form an assembly 71.

The cap 48, which may be constructed from a plastic-type material such as polycarbonate, includes an annular side member 43 and a portion 45 having a typical thickness T which is coupled to the side member 43 and arranged so as to be lower than the upper portion of the side member by a minimum predetermined amount such as 0.020 of an inch, thereby creating a recessed portion 44. The portion 45 includes a portion 46 having a thickness T' which is less than the thickness T and which has a plurality of through holes contained therein and may resemble a mesh-like portion. In a preferred embodiment, the thickness T' of the portion 46 has a thickness of less than 0.030 of an inch. Since the portion 46 represents a relatively small amount of the portion 45, reducing the thickness therein does not adversely affect the overall structural rigidity of the cap 48. Alternatively, the portion 46 may be constructed from a stronger material, for example, stainless steel or such similar material, and combined with the portion 45. As is to be appreciated, by arranging the portions 45 and 46 so as to be recessed from the upper portion of the side member 43, even when the receiver portion 42 is placed on a surface, the side member 43, and not the portions 45 or 46, contact such surface. As a result, any loads are not directly impacted on the portion 45 and/or the portion 46, but are instead delivered to the side member 43.

The cap 48 is positioned over the assembly 71 so that the first and second microphones 12 and 14, respectively, are arranged below the portion 46 with the first microphone positioned relatively close to the underside of the portion 46. Thus, the speech travels a relatively short distance from an operator, who is speaking into the receiver portion 42 from a distance of preferably less than 1 inch, through the portion 46 to the first microphone. As a result, acoustic distortions are minimized.

The arrangement of the first and second microphones 12 and 14, respectively, within the receiver portion 42 is illustrated in FIGS. 3A and 3B. More specifically, as shown in FIG. 3B, the first and second microphones are arranged so as to have an angle $\phi$ therebetween, which preferably has a value in a range between 30° and 60°. The first and second microphones are further respectively arranged so as to have an angle $\ominus$ and $[(90-\ominus)+\phi]$ between a plane parallel to the receiving or "sensitive" surface of the first microphone 12 and the direction of speech from an operator, and an axis normal to the sensitive surface of the second microphone 14 and the direction of speech, as shown in FIG. 3B; and so as to have an angle $\Psi$ between the direction of speech and the second microphone, as shown in FIG. 3A. In a preferred embodiment, the angle $\ominus$ has a value of less than approximately 35° and the angle $\omega$ has a value of approximately 180°. As a result of arranging the first and second microphones in this manner, the first microphone 12 receives both the speech from the operator and the background acoustic noise which is present in the vicinity, and the second microphone 14 essentially receives only the same background acoustic noise which is received by the first microphone.

Although, as previously mentioned, the angle $\phi$ has a value which is preferably between 30° and 60°, the first and second microphones 12 and 14, respectively, may nevertheless operate satisfactorily even if arranged so as to have an angle $\phi$ which lies outside this range. However, as the angle $\phi$ becomes substantially smaller than 30° or larger than 60°, the performance may be adversely affected. That is, when the angle $\phi$ becomes substantially smaller than 30°, the second microphone 14 receives both the speech and background noise. As a result, upon subtracting the output signal of the second microphone 14 from the output signal of the first microphone 12, a portion or all of the speech may be canceled. On the other hand, when the angle $\phi$ is substantially larger than 60°, the background noise received by the second microphone 14 may not be similar to that received by the first microphone 12. As a result, subtracting the output signal of the second microphone 14 from the output signal of the first microphone 12 may not adequately cancel the background noise received by the first microphone.

In a like manner, although the angles $\theta$ and $\Psi$ have preferred values of less than 35° and approximately 180°, respectively, as previously mentioned, the first and second microphones may operate satisfactorily even if arranged so as to have different values of these angles. However, as the values of the angles $\theta$ and $\Psi$ become substantially different from the respective preferred values, the performance may be adversely affected. That is, when the angle $\theta$ becomes substantially larger than 35°, the second microphone 14 may receive both the speech and background noise. Similarly, when the angle $\Psi$ is substantially smaller or larger than 180°, the second microphone 14 may receive both the speech and background noise. As a result, in either of these situations, upon subtracting the output signal of the second microphone 14 from the output signal of the first microphone 12, a portion or even all of the speech may be canceled.

As is to be appreciated, by using the above-described devices and materials for the components of the receiver portion 42, the cost for constructing such receiver portion is relatively low. Further, by using CMOS chips, as previously described, the power consumption of the receiver portion is kept relatively low. As a result, the receiver portion may be powered by the standard power available in the handset and, as such, does not require additional power or transformers or the like. Furthermore, although the receiver portion 42 has been described for assembly with the handset 10 of the telephone 8, which is a new telephone, such receiver portion, or a slight variation thereof, may be used in handsets of existing telephones. That is, in this latter situation, the cap and microphone contained within the handset of an existing telephone are merely replaced with the receiver portion 42. Thus, such use of the receiver portion 42 provides a relatively easy and low-cost means to modify a handset of an existing telephone to include the present noise reduction apparatus.

Figure 4:
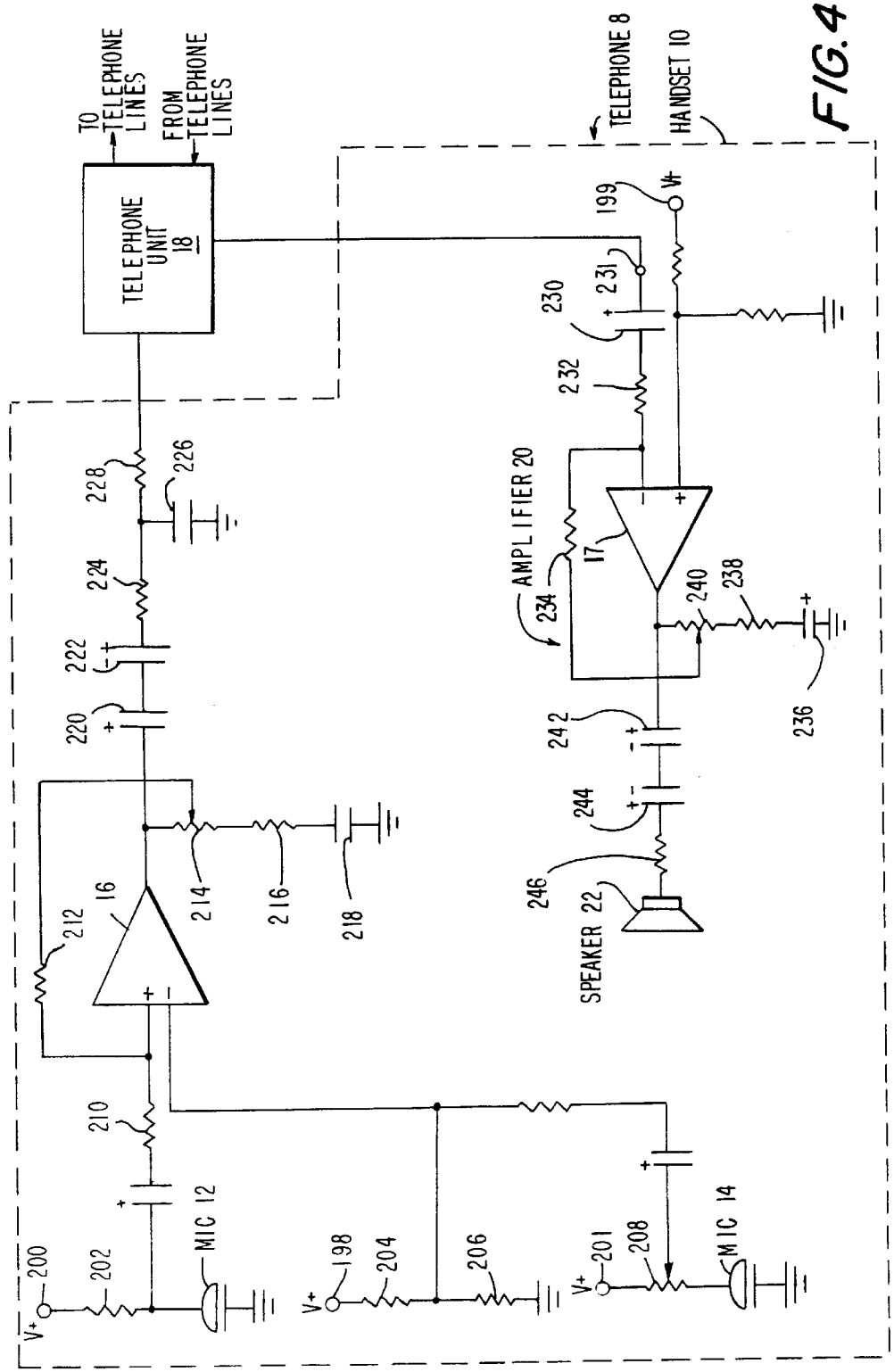
FIG. 4 is a schematic diagram of the block diagram of FIG. 2.

FIG. 4 illustrates a schematic diagram of one circuit arrangement of the telephone 8 shown in FIGS. 1 and 2. As shown in FIG. 4, the first microphone 12 is coupled through a resistor 202, which is adapted to function as a current limiting resistor so as to correct the bias of an output from the first microphone, to an input power terminal 200. The first microphone 12 is further coupled through a resistor 210 to the plus terminal of the op-amp 16 and through a resistor 212 to a variable resistor 214. The second microphone 14 is coupled through a variable resistor 208, which is adapted to function as a current limiting resistor so as to correct the bias of an output of the second microphone, to an input terminal 201, and to the minus terminal of the op-amp 16. The limiting resistor 208 is preferably a variable current limiting resistor which enables the level of the output signal from the second microphone to be matched to within a predetermined value to the level of the output signal of the first microphone 12. More specifically, the limiting resistor 208 enables the output signal of the second microphone 14 to be weighted such that when a signal having a similar level is outputted from the first microphone 12, the amplitude of the difference therebetween is minimized. The value of the current limiting resistor 208 can be selected according to minimization criteria. A power terminal 198 is connected to resistors 204 and 206, which are adapted to divide the voltage received at the input power terminal 198, and to the minus terminal of the op-amp 16. The output of the op-amp 16 is coupled to capacitors 220, 222 and 226 and resistors 224 and 228 which, in turn, is connected to a "microphone input" terminal of the telephone unit 18. The output from the op-amp 16 is further coupled through a variable resistor 214, a resistor 216 and a capacitor 218 to ground. Resistors 210, 212 and 216 and variable resistor 214 provide variable gain, for example, 20 to 1 amplification, to the output of the op-amp 16. The capacitors 218, 220 and 222 are adapted to remove residual DC (direct current) levels which may be present in the output signal from the op-amp 16. The resistors 224 and 228 and the capacitor 226 are adapted to function as a low-pass filter having a break point at a predetermined value which, for example, may be 3.7 kHz.

The telephone unit 18 is further connected to the telephone lines and is adapted to receive signals through the microphone input terminal and to supply these signals to the desired telephone or telephones by way of the telephone lines. The telephone unit 18 is further adapted to receive signals from another telephone or telephones by way of the telephone lines and to combine such signals with those received through the microphone input terminal, as previously described, and to supply the combined signal to a speaker input terminal 231. The input terminal 231 is connected through a capacitor 230, which is adapted to block DC signals, and a resistor 232 to the minus terminal of an op-amp 17 and through a resistor 234 to a variable resistor 240. An power terminal 199 is connected to the plus terminal of the op-amp 17. The output from the op-amp 17 is connected through capacitors 242 and 244 and a resistor 246 to the speaker 22. The output from the op-amp is further connected through the variable resistor 240, a resistor 238 and a capacitor 236 to ground.

The operation of the telephone 8 shown in FIG. 4 will now be described below.

Upon activating the handset 10, by lifting the handset 10 from the switch hook (not shown) or the like, standard telephone line voltage is applied to input terminals 198, 199, 200 and 201. A signal from the first microphone 12, which has been bias corrected by the current limiting resistor 202, is supplied through the resistor 210 to the plus terminal of the op-amp 16. An output signal from the second microphone 14, which has been bias corrected by the current limiting resistor 208, is supplied to the minus terminal of the op-amp 16. The op-amp 16 subtracts the signal received from the second microphone 14 from that received from the first microphone 12 and outputs the resulting subtracted signal. DC levels which may be present in the output signal are removed and the signal is amplified. High frequency signals, such as those over 3.7 kHz, are then removed from the amplified output signal and the resulting signal is supplied to the telephone unit 18. Thus, a voltage signal is supplied to the telephone unit 18 which is proportional to the difference between the voltages generated by the first and second microphones 12 and 14, respectively.

An output signal from the telephone unit 18, which is a combination of the signals received through the microphone input terminal and the telephone lines, is supplied to the input terminal 231 of the amplifier 17. The signal from the input terminal 231 is supplied to the capacitor 230 so as to remove any DC signals which may be present. The output from the capacitor 230 is supplied through the resistor 232 to the minus terminal of the op-amp 17. The op-amp 17 buffers the signal from the telephone unit 18 and supplies the received signal plus the sidetone to op-amp input 231. Such signal may be selectively amplified, through the use of resistors 232, 234 and 238 and variable resistor 240, by the operator by use of the switch 40 (FIG. 1). Any DC signals which may be present in the amplified signal are thereafter removed by the capacitors 242, 244 and 236. The output signal from the capacitor 244 is current limited by the resistor 246 and is thereafter supplied to the speaker 22 so as to be converted thereat into an acoustic signal.

Figure 5:
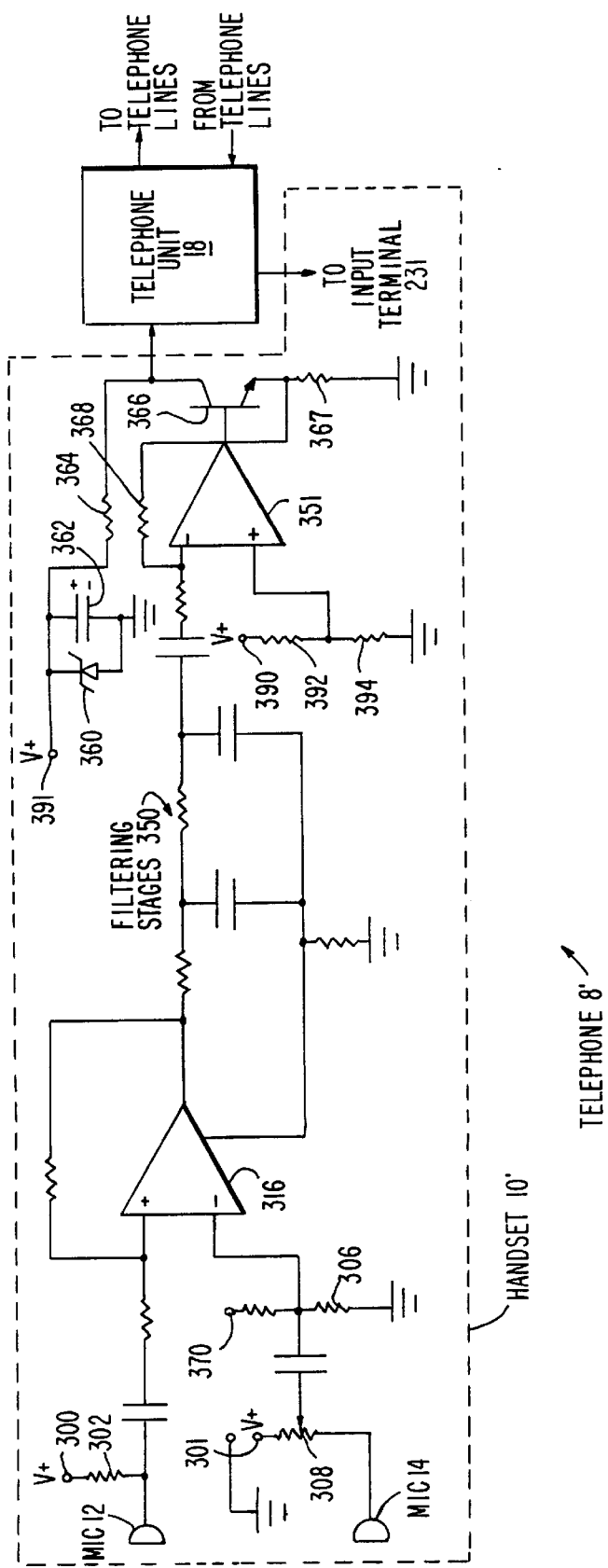
FIG. 5 is another schematic diagram of the noise cancellation apparatus illustrated in FIG. 2.

FIG. 5 illustrates an alternative arrangement for processing the signals obtained from the first and second microphones 12 and 14, respectively, so as to provide a current output for supply to the telephone unit 18 which is proportional to the difference of the voltages generated by the first and second microphones.

More specifically, the circuit arrangement of FIG. 5 includes a handset 10' having a plurality of input terminals 300, 301, 370 and 390 which are each adapted to receive standard available on-line power. The first microphone 12 is coupled through a current limiting resistor 302 to the input power terminal 300 and is further coupled to the plus terminal of a subtracting device 316, which is preferably a CMOS op-amp. The output from the second microphone 14 is coupled through a variable current limiting resister 308 to the input terminal 301 and is further coupled to the minus terminal of the op-amp 316. The signal outputted from the op-amp 316 is supplied through filtering stages 350 to the minus terminal of a subtracting device 351 which is preferably a CMOS op-amp. The filtering stages 350 are adapted to provide a predetermined frequency response characteristic such as a signal roll-off at a predetermined frequency. As is to be appreciated, although two filtering stages are shown in FIG. 5 any number of filtering stages may be utilized. The input power terminal 390 is coupled to resistors 392 and 394, which are adapted to reduce the signal supplied thereto, and to the plus terminal of the op-amp 351. An output signal from the op-amp 351 is supplied to the base of a transistor 366. The input power terminal 391 is connected to a Zener diode 360, a capacitor 362 and a resistor 364 which, in turn, is connected to the collector of the transistor 366 and to the microphone input terminal of the telephone unit 18. The emitter of the transistor 366 is coupled through resistors 367 and 368 to the minus terminal of the op-amp 351 so as to provide a feedback loop thereto. The op-amp 351 and the associated components provide electrical isolation between the filtering stages 350 and the transistor 366. The transistor 366 is adapted to amplify the signal supplied to the telephone unit 18.

The output from the telephone unit 18 is coupled to the input terminal 231 (FIG. 4) and is thereafter processed in the manner previously described with reference to the handset 10 of FIG. 4 so as to provide an acoustic signal from the speaker 22.

The operation of the telephone 8' will now be described below.

Upon applying power to the handset 10', by lifting the handset from the switch hook (not shown) or the like, a portion of telephone line voltage is applied to input terminals 300, 301, 370, 390 and 391. A signal from the first microphone 12, which has been bias corrected by the current limiting resistor 302, is supplied to the plus terminal of the op-amp 316. An output signal from the second microphone 14, which has been bias corrected by the current limiting resistor 308, is supplied to the minus terminal of the op-amp 316. The resistor 308 is preferably a variably current limiting resistor which enables the level of the output signal from the second microphone 14 to be matched to within a predetermined value to the level of the output signal of the first microphone 12, in a manner substantially similar to that previously described for resistor 208. The output difference signal from the op-amp 316 is provided though the filtering stages 350, which may include one or more RC networks or equivalent circuits, so as to limit the upper frequency of the output signal to a predetermined value 25 which, for example, may be 3.7 kHz. The output signal from the filtering stages 350 is supplied to the minus terminal of the op-amp 351 and a voltage signal from the input power terminal 390, which has been divided to a predetermined value such as one half thereof, is supplied to the plus terminal of the op-amp 351 which amplifies the corresponding output signal to the base of the transistor 366. The voltage from the input power terminal 391 is supplied through the resistor 364 to the collector of the transistor 366. As a result, an amplified signal is supplied from the handset 10' to the telephone unit 18 for supply therefrom through the telephone lines to the desired telephone(s) and for combining with a received signal from the telephone(s) for supply to the input terminal 231 in a manner similar to that previously described with reference to FIG. 4.

The individual circuit components without reference designations depicted in FIGS. 4 and 5 are connected as shown and will not be discussed further, since the connections and values are apparent to those skilled in the art and are not necessary for an understanding of the present invention.

Figure 6A:
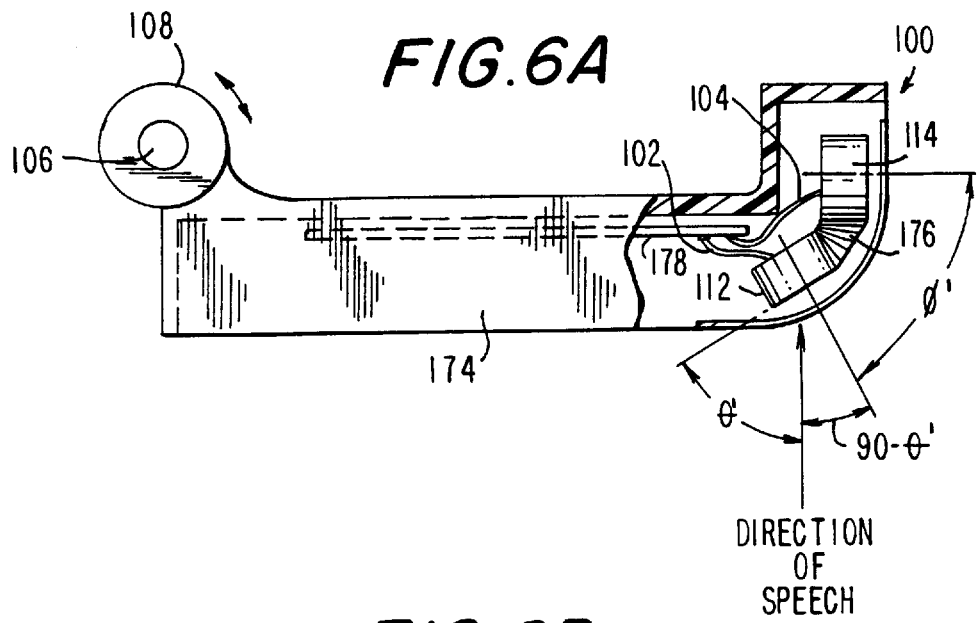
FIGS. 6A, 6B and 6C illustrate a boom microphone device utilizing a noise reduction apparatus according to an embodiment of the present invention.
Figure 6B:
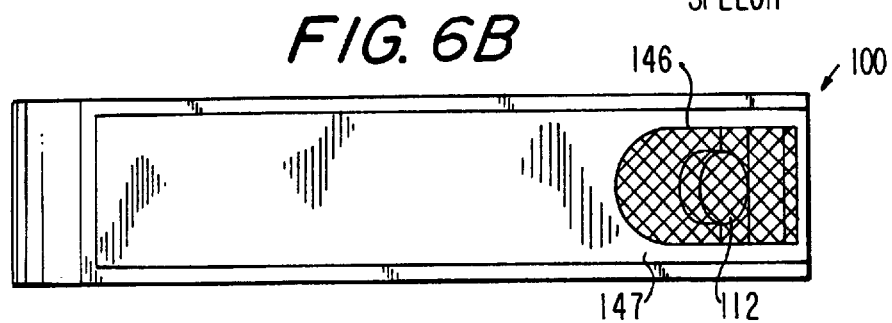
Figure 6C:
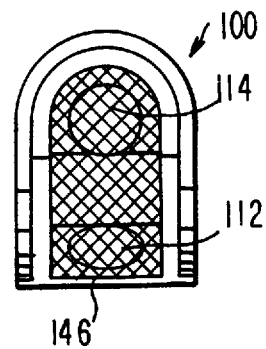

FIGS. 6A, 6B and 6C illustrate a boom microphone 100 which utilizes a noise cancellation apparatus in accordance with an embodiment of the present invention. More specifically, the boom microphone 100 generally includes a housing 174, a circuit board assembly 178, first and second microphones 112 and 114, respectively, and a portion 147. The housing 174, which may be constructed from either a plastic-like or metal-type material, includes a circular portion 108 having a hole therethrough so as to enable a shaft 106 to be inserted therein. As a result, the boom microphone 100 may rotate about the shaft 106 as illustrated in FIG. 6A.

The first and second microphones 112 and 114 are respectively coupled to the circuit board assembly 178 by wires 102 and 104. The circuit board assembly 178 contains circuitry similar to that on the circuit board assembly 78 which, as previously described, processes the signals from the first and second microphones 12 and 14, respectively, for supply to the telephone unit 18 and, as such, in the interest of brevity, will not be further described herein. Therefore, the circuit board assembly 178 is adapted to receive a speech and background noise signal from the first microphone 112 and to subtract therefrom the background noise signal from the second microphone 114 so as to derive a signal which represents substantially the speech. Such signal is supplied to a transmitting device (not shown) so as to be converted to a RF signal and transmitted to a remote receiving device (not shown). The first and second microphones 112 and 114, respectively, are held in place by a holding member 176 which, for example, may be constructed of a foam-like material. A mesh-like screen 146 which, for example, may be fabricated from a plastic-type or a metal material or the like, is attached to the cut away portion 147 so as to protect the first and second microphones. The mesh 146 has a predetermined thickness which, for example, may be approximately 0.030 or less of an inch.

The first and second microphones 112 and 114, respectively, which may be electret microphones, are arranged in a manner similar to that of the previously described first and second microphones 12 and 14, respectively, of the handset 10. That is, the first and second microphones 112 and 114, are respectively positioned so as to have an angle $\theta'$ and $[(90-\theta')+\phi']$ between a plane parallel to the receiving or sensitive surface of the first microphone and the direction of speech from an operator, and between an axis normal to the sensitive surface of the second microphone and the direction of speech, as shown in FIG. 5A. Further, the first and second microphones 112 and 114, respectively, are arranged so as to have an angle $\phi'$ therebetween, which has a preferred value in a range between 30° and 60°. The first and second microphones 112 and 114, respectively, are located in relatively close proximity to the mesh 146 and the cut away portion 147 of the housing 174 so as not to receive acoustic sounds which have been unacceptably distorted.

Although the above embodiments have been described as having only one first microphone 12 (112) and one second microphone 14 (114), the invention is not so limited and any number of microphones may be utilized for the first microphone and/or the second microphone. For example, a receiver portion 42' (not shown) may be configured which includes two or more microphones operating as a first microphone 12' (not shown) and two or more microphones operating as a second microphone 14' (not shown). In this configuration, when using multiple microphones for the first and/or second microphones, respective variable current limiting resistors are preferably provided for all but one microphone for the first microphone 12' and for all microphones for the second microphone 14'. Thus, the outputs from the first and second microphones, 12' and 14', respectively, would comprise a weighted sum of several such microphone output voltages. The current limiting resistors are preferably set to respective values so as to minimize some functional of the difference of the first and second microphones 12' and 14', respectively. The criterion for selecting the values of the current limiting resistor or equivalently the weighing function of each microphone could be selected according to any well known gradient search algorithm.

Figure 9B:
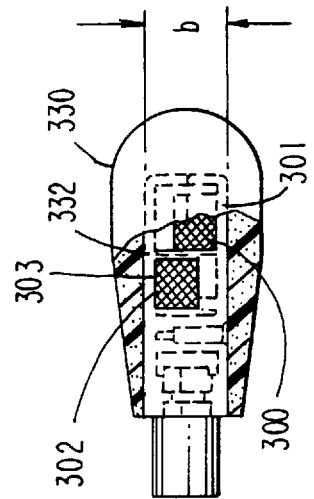
Figure 9A:
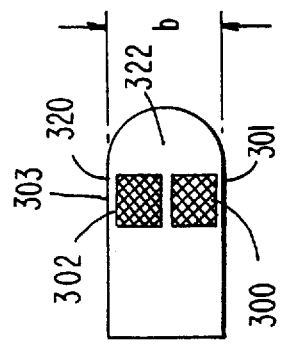

FIG. 9A illustrates a microphone boom 320 having a first microphone 300 and a second microphone 302 arranged therein. The first microphone 300 includes a pressure sensitive surface 301 and the second microphone 302 includes a second pressure sensitive surface 303. As shown in FIG. 9A, the first and second microphones 300 and 302 are arranged such that the respective pressure sensitive surfaces 301 and 303 are substantially 180° apart from each other. The microphones 300 and 302 are further arranged so as to have a structural baffle 322 between the microphones. Such structural baffle 322 may be comprised of a structural member adapted to provide an acoustical separation between the microphones. Alternatively, an acoustical baffling arrangement could be utilized in place of a structural member. Furthermore, as shown in FIG. 9A, the first and second microphones 300 and 302, and in particular their respective pressure sensitive surfaces 301 and 303, are located within a distance or dimension b.

The first microphone 300 is adapted to receive acoustical sound such as speech from a user and to convert such received acoustical speech into a signal corresponding to such speech. Such first microphone 300 may also receive background noise which may exist. As is to be appreciated, such background noise is combined with the speech from the operator and, as such, the signal provided by the first microphone corresponds to both the speech from the user and the background noise. On the other hand, the second microphone 302 is arranged within the microphone boom 320 so as to receive primarily only the background noise. More specifically, the pressure sensitive surface 303 of the second microphone 302 is preferably arranged at an angle of substantially 180° from the pressure sensitive surface 301 of the first microphone 300. Further, as previously mentioned, the first and second microphones 300 and 302 have a baffle 322 arranged therebetween. Such baffle is adapted to minimize or prevent any speech from the user from being received by the second microphone 302. Furthermore, the first and second microphones 300 and 302 are preferably arranged within relatively close proximity to each other, that is, within the distance b. As an example, such distance b may lie within a range of 0.10 to 0.50, preferably about 0.25 of an inch, or less. Suitable distance b may be determined by the skilled artisan from this disclosure, without undue experimentation and, the invention is not necessarily limited to a particular value for b.

FIG. 9B illustrates a microphone boom 330 having first and second microphones 300 and 302 arranged somewhat differently than in the microphone boom 320 of FIG. 9A. That is, as shown in FIG. 9B, the first and second microphones 300 and 302 are located staggered side by side relationship to one another. Further, a baffle 332 is provided between the first and second microphones 300 and 302 so as to provide acoustic separation of the speech in a manner similar to that provided by the baffle 322 of FIG. 9A.

Figure 24:
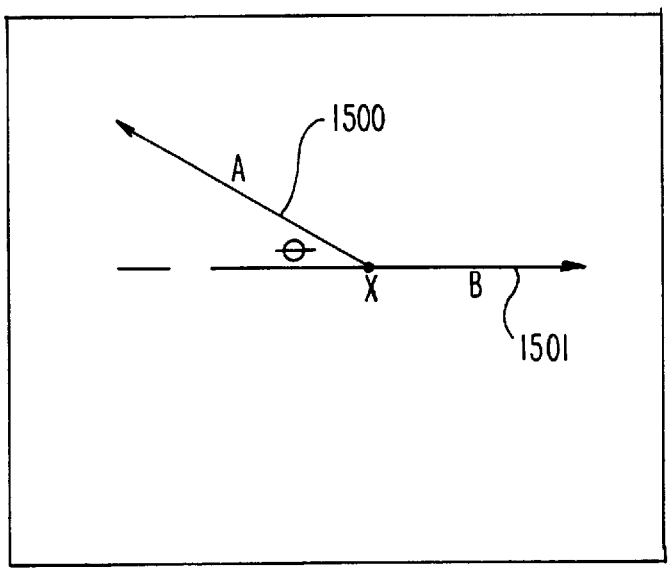
FIG. 24 is a diagram of the quiet zone achieved by utilizing the active noise reduction system.

FIG. 9C illustrates a boom headset assembly 400 incorporating the active noise reduction device. As shown therein, such headset assembly 400 generally includes a headband 401, a left case 402 having a left cover 403 and a left cushion 409, a right case 404 having a right cover 405 and a right cushion 410, a microphone boom assembly 413, and a microphone boom 440. Such microphone boom 440 includes first and second microphones 300 and 302 which may be arranged in a manner as previously described with reference to FIGS. 9A and 9B. Further, such microphone boom assembly 440 includes an upper microphone case 406, a lower microphone 407, and the first and second microphones 300 and 302, and a windsock 408. FIG. 9C shows the arrangement of the active noise reduction apparatus comprising a sensor microphone 450 arranged relative to the output transducer 460 and the acoustic filter 470 which can be a foam, pad, or the like. The preferred acoustic filter 470 is the Slo- flow foam, which is used to create an acoustical waveguide between the speaker and the ear of the user as will be detailed in FIGS. 23A and 23B. The function of the acoustic filter 470, which partially covers the sensor microphone 450 is to isolate the pickup microphone from the output transducer. The pickup microphone 450 does not have to be in the same plane as the output transducer 460, but can be located above, below, tangential or adjacent to the plane of the output transducer 460. The portion of the acoustic filter 470 not adjacent to the sensor microphone 450 also acts as an acoustical waveguide 475 located between the output transducer 460 and the ear of the user. The acoustical waveguide 475 is where the quiet zone is created as shown in FIG. 24. The acoustic waveguide 475 couples the user ear to the output transducer for increased speaker efficiency. This positioning of the sensor microphone 450 in a plane outside the plane of the speaker allows for a close distance to the quiet zone for accurate phase agreement between noise and anti noise signals. In addition, the placement and orientation of the sensor microphone 450 minimizes microphone sensitivity lobe patterns in the direction of the speaker sound field. The sensor microphone 450 used in the active noise reduction apparatus is an omnidirectional microphone, which is receptional to noise from all angles. This characteristics of the sensor microphone allows flexibility in the positioning of the microphone with the earpiece of the headset.

FIG. 9D illustrates a side view of the boom headset assembly 400. As shown therein, the left case 402 includes a circuit card assembly 412, which may contain circuitry utilized in processing the acoustic signals as hereinafter more fully described, and further includes a cable assembly 411 for supplying signals to and from outside or host equipment (not shown). FIG. 9E illustrates a side view of the right case 404.

FIG. 9F shows an alternative embodiment of the sensor microphone 450 location in the noise reduction apparatus. In FIG. 9F the sensor microphone is located adjacent the output transducer 460 but not necessarily in the same plane as the transducer. The acoustical waveguide 475 covers a substantial portion of the speaker, with the microphone 450 outside the quite zone area created within the waveguide 475.

As previously described, the first and second microphones 300 and 302 are preferably arranged within a distance b and are further arranged such that the first microphone 300 receives both speech and background noise while the second microphone receives primarily just the background noise. Such background noise may originate as a pressure sound source from a location 304 as illustrated in FIGS. 7A and 7B. That is, as shown therein, such location 304 may be located at a distance r from a center location between the first and second microphones 300 and 302 so as to form an angle θ therebetween. As a result, the distance between the first microphone 300 and the location 304 is approximately equal to the value $[r-(b/2)(\sin \theta)]$, and the distance between the location 304 and the second microphone is approximately equal to the value [r+(b/2)(sin θ)].

Figure 8:
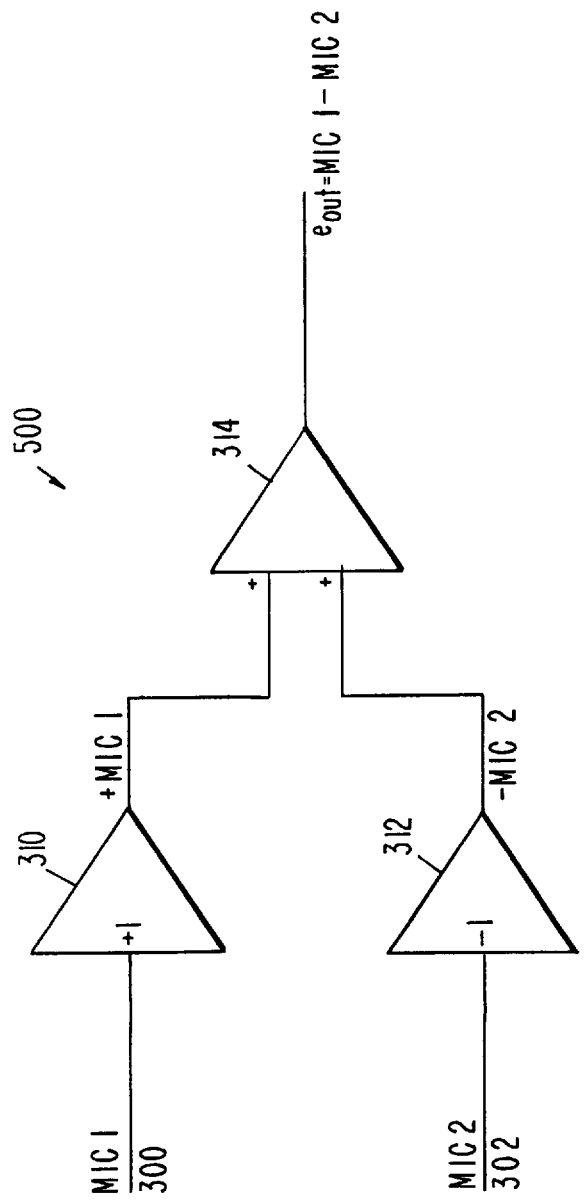
FIG. 8 illustrates a noise reduction apparatus according to the present invention.

FIG. 8 illustrates a differential amplifier 500 which is adapted to process the signals produced by the microphones 300 and 302. As shown therein, such differential amplifier 500 includes an amplifier 310, an amplifier 312 and a summing circuit 314. The signal produced by the first microphone 300 is supplied to the amplifier 310 which is adapted to provide essentially a unity gain to such signal and provide the same as an output signal. Such output signal is supplied to one input of the summing circuit 314. The signal produced by the second microphone 302 is supplied to the amplifier 312 which is adapted to essentially invert the received signal and to supply the same to a second input of the summing circuit 314. The summing circuit 314 is adapted to add the received signals together so as to produce a summed output signal $e_{(out)}$. As is to be appreciated, such summed output signal $e_{(out)}$ represents a signal corresponding to substantially only the speech from the user.

FIGS. 10A and 10B illustrate the differential amplifier 500 of FIG. 8 in more detail. That is, FIG. 10A illustrates a first arrangement of such differential amplifier 500, and FIG. 10B illustrates a second arrangement of such differential amplifier. Each of these schematic diagrams will now be more fully described.

As shown in FIG. 10A, the signal produced by the first microphone 300 is supplied to an input terminal 600 and is supplied therefrom through a Capacitor C1 and a resistor R to an inverting input of an operational amplifier (op-amp) V1A. The signal produced by the second microphone 302 is supplied to an input terminal 602. Such input terminal 602 is coupled to a potentiometer RA which, in turn, is connected to ground. The input terminal 602 is further coupled through a capacitor C2 and resistors R1 and 2R to a non-inverting input of the op-amp V1A. Such op-amp is adapted to operate in a differential mode and provides an output signal therefrom to a terminal 606 which, in turn, is coupled to the inverting input of the op-amp V1A. Such output from the op-amp V1A is further supplied to a potentiometer 608 which, in turn, has one end connected to ground. Such potentiometer 608 is coupled through a coupling capacitor C3 to a non-inverting input of an op-amp V1B. The output of such op-amp V1B is supplied to the base of a transistor 610. The emitter of such transistor 610 is coupled to a terminal 612 which, in turn, is coupled through a capacitor C4 to an output terminal 614. The summed signal $e_{(out)}$ is supplied from the terminal 614. The collector of the transistor 610 is coupled to a terminal 616 which, in turn, is connected to a power supply (not shown) which supplies a voltage V+ to the circuit. The terminal 616 is connected to resistors R3 and R4 which are adapted to provide a DC bias. The elements not specifically described are connected as illustrated in FIG. 10A.

By utilizing the above-described circuit illustrated in FIG. 10A, the impedance shown to the first and second microphones 300 and 302 is symmetrically balanced so as to minimize differential phase shifts between frequencies. Further, the output signal from such circuit has a relatively low impedance.

FIG. 10B illustrates a second or alternate circuit of the differential amplifier 500 of FIG. 8 as previously described. The circuit of FIG. 10B is adapted to receive power through a source resistance from a power supply (not shown). That is, the power for driving the circuit of FIG. 10B is supplied from a power supply having a finite output resistance R unlike that supplied from a power supply having a zero output resistance (such as that of FIG. 10A). Otherwise, as is to be appreciated, the circuit illustrated in FIG. 10B is substantially identical to that of FIG. 10A and as such, will not be further described herein.

Figure 11:
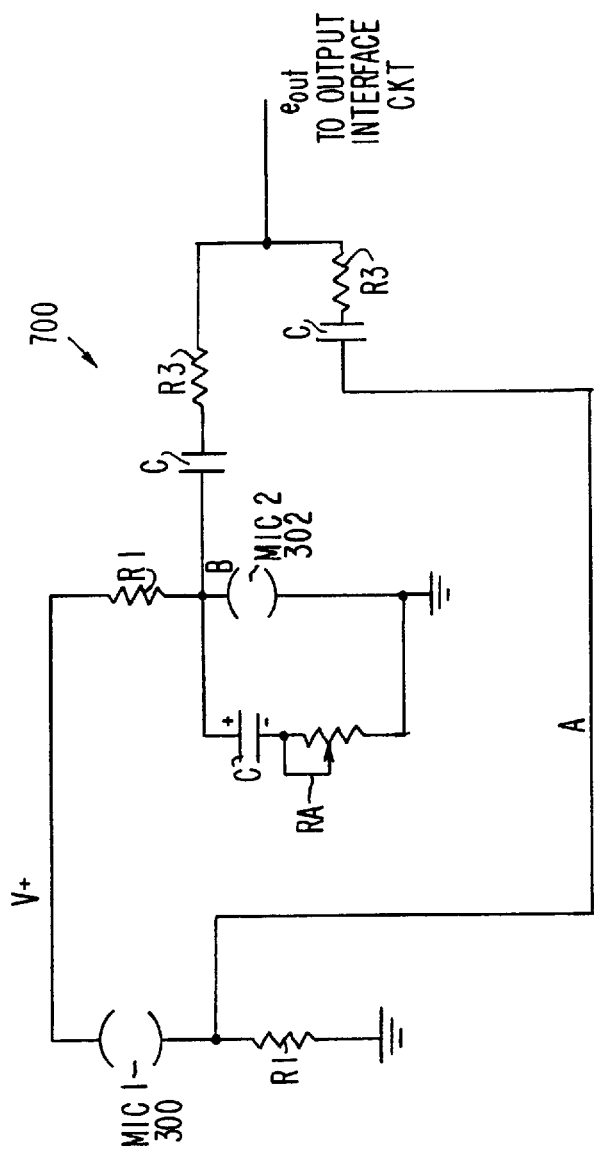
FIG. 11 illustrates a phase reversing circuit.

FIG. 11 illustrates a phase reversing circuit which may be utilized in place of the circuits illustrated in FIG. 10A or FIG. 10B. As illustrated therein, such circuit 700 generally includes the first and second microphones 300 and 302, the magnitude adjustment potentiometer RA, resistors R1 and R3, and capacitors C which are coupled as illustrated in FIG. 11. Each of the first and second microphones 300 and 302 may include a field effect transistor (FET) in which the drain of such FET may be considered a positive (+) and the source of such FET may be considered a negative (−). The phase between such drain and source is approximately 180°. For example, the drain thereof may have a phase of 180°, whereas the source has a phase of 0°. As a result, each of the first and second microphones 300 and 302 includes two terminals, that is, a positive (+) terminal and a negative (−) terminal. In the circuit of FIG. 11, the positive (+) terminals of the first and second microphones may be the upper terminals thereof, whereas the negative (−) terminals of such microphones may be the lower terminals thereof. Further, the magnitude adjustment potentiometer RA may be adjusted or set during the initial assembly thereof or alternatively may be adapted so as to be adjustable by an operator of the boom headset assembly 400 of FIG. 9C. The output signal $e_{(out)}$ has a value of zero (0) when an acoustical sound having the same pressure is received by both the first and second microphones 300 and 302.

Figure 12:
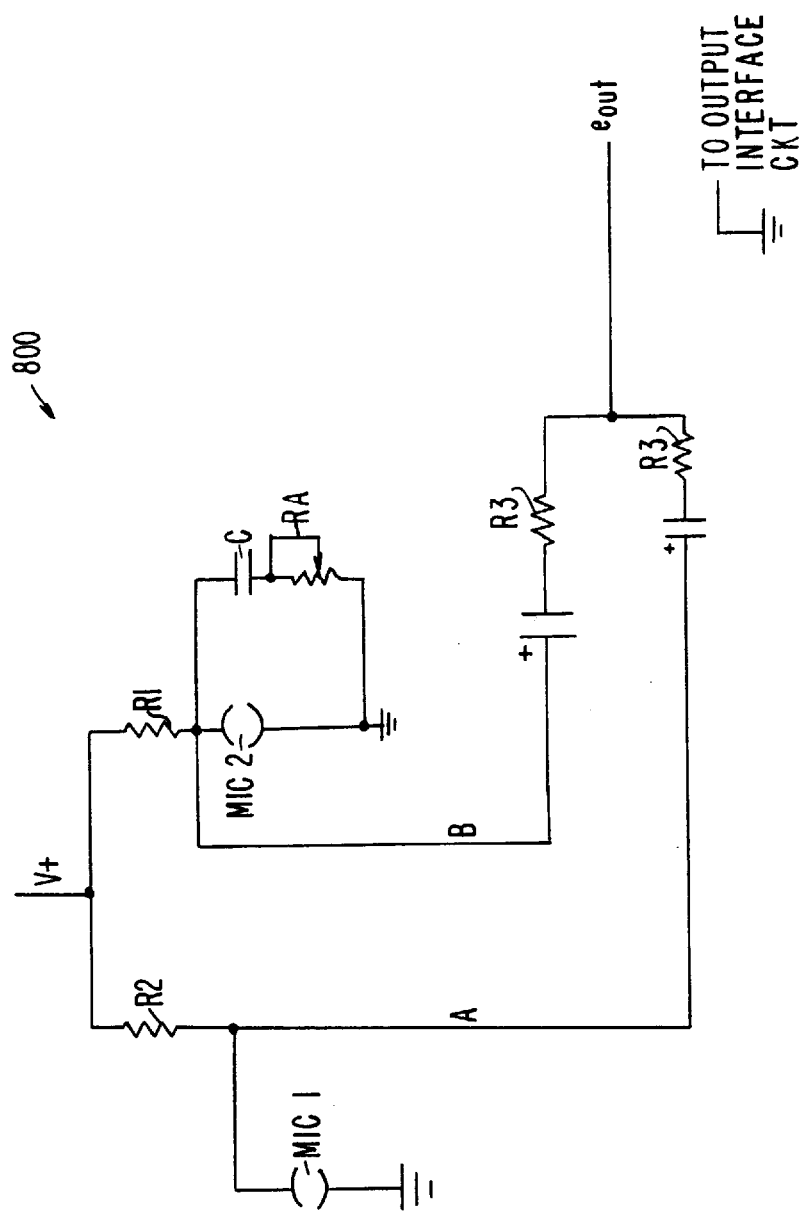
FIG. 12 illustrates an oppositely charged microphone circuit.

FIG. 12 illustrates a circuit 800 which may be utilized in place of the phase reversing circuit 700 of FIG. 11. In the circuit 800, the microphones 300 and 302 are oppositely charged. As a result, when the outputs thereof are summed together, as when the first and second microphones receive an acoustical sound having the same pressure, the output signal $e_{(out)}$ has a value of substantially zero (0). The remaining portions of the circuit 800 are substantially similar to those of the circuit 700 of FIG. 11 and, as such, will not be further described herein.

Thus, any of the circuits illustrated in FIG. 10A, 10B, 11 or 12 may be utilized in the present invention. Such circuits enable calibration processing to be performed on the first and second microphones 300 and 302 which may be electret-type microphones. Further, such circuits may be included on a printed circuit (pc) board which may be installed within the headset assembly 400 as, for example, as on the pc board 412 illustrated in FIG. 9D. Alternatively, such pc board may be included in other locations of the headset assembly 400 or alternatively may be located on host equipment which is removed from the headset assembly 400.

Thus, the present invention provides an assembly and, in particular, a boom headset assembly, which is adapted to reduce or eliminate background noise. The inventive apparatus can utilize first and second microphones which act as a dipole, which may be matched by the manufacturer or by testing after manufacture, and which have a frequency response which is essentially flat over the anticipated operating range. Further, such first and second microphones are preferably arranged such that their respective pressure sensitive surfaces are arranged at 180 mechanical degrees from each other and are located in close proximity thereto as previously described. By so arranging the first and second microphones, a sound (in particular a background noise) originating from a source which is located at a distance substantially greater than the distance between the microphones, enables the sound from such sound source to be received by both microphones simultaneously. As a result, no substantial phase differential therebetween occurs. Furthermore, the present invention enables the amount of noise cancellation to be adjusted either during the fabrication of the present boom headset assembly or alternatively by an operator utilizing such assembly.

The boom microphone, for instance, of FIGS. 7A to 13B, can be based upon the principles governing the directivity patterns of omni-directional microphones in the near and far fields and the correct placement of the microphone's pressure sensitive surfaces. The physical design of the microphone as seen in FIGS. 9A and 9B is the determining factor in the S/N increase. Examination of these drawings shows that the microphone pressure sensitive surfaces are preferably placed at 180 mechanical degrees from each other, and provide the optimum separation of the signal going to the voice microphone and noise microphone in the near field. This separation is a primary component in the determination of the signal in the S/N ratio. Basically, to achieve signals in the far field is to add vectorially, at a desired point, the sound pressures arriving at that point from all simple sources. A basic element of this analysis will be what is herein called the Doublet Sound Receiver.

The geometric situation is shown in FIGS. 7A and 7B. It is assumed that the distance r from the two receiving microphones (300,302) to point A at which the pressure P originates is large compared with the separation b between the two microphones (300,302). The spherical sound wave from point A arriving at the receiving doublet will have traveled at a distance (r−b/2 sin θ) for microphone 300 and at a distance equal to the value (r+b/2 sin θ) for microphone 302. If r>>b as shown in FIGS. 7A and 7B, the distance traveled by the spherical wave is r, and the output of each receiving microphone (300,302) is equal. If the summed outputs of the two microphones (300,302) are zero as in FIG. 8, then the associated scale factors are equal. If their associated scale factors are not equal, any phase and amplitude of pressure can be the $e_{(out)}$ as shown in FIG. 8. Amplitude adjustment can be obtained electrically and is performed, but phase adjustment is not necessarily possible at all frequencies. The requirement for phase adjustment is not required because reproducibility is inherent in the manufacture of the microphones and they provide outputs of tracking phase with frequency. This method is described as a magnitude and phase microphone lobe constructions which is the basis of the directional microphone of the present invention. These microphones will be capable of accepting sounds in certain directions better than in other directions.

The microphones just described are the dual of a doublet sound source and are similar to the theory of dipoles. In addition, if the spacing b, between the microphones is small (b<<λ) compared with the wavelengths (λ) at any distance r, the two microphones essentially coalesce and the output at any angle φ will be zero for matched scale factors (magnitude/phase) at any frequency. In addition, the output at any angle θ can be electrically scaled and phased for the desired lobe intensity output. If b is not much smaller than r, the phase relationship between the two microphones to an incoming sound wave is:

$$\phi = \frac{360bf}{V} \quad (1)$$

Where
b=spacing between sensor mic and noise mic
f=frequency in hz
v=speed of sound in/sec
φ=phase shift at a specific frequency As can be seen from equation (1), this phase relationship is the theoretical limit for the crossing of the near and far fields of the noise canceling microphone. As the frequency changes at a fixed b, the phase changes, i.e.: at φ=90°, there may be no cancellation at all. This phase change, in the absence of acoustic filters can be a governing factor in the bandwidth of the cancellation.

The embodiment of the invention of FIGS. 7A to 13B can be used on the far field pattern of the microphones for noise cancellation. The reduction of the effect of b, is performed by the use of an acoustic design that tends to minimize or reduce to zero, dimension b, in FIG. 9A, and that is modified to reduce the thickness of the probe as in, FIG. 9B. Both designs use the relationship between b and r (i.e.: b<<r).

Figure 14:
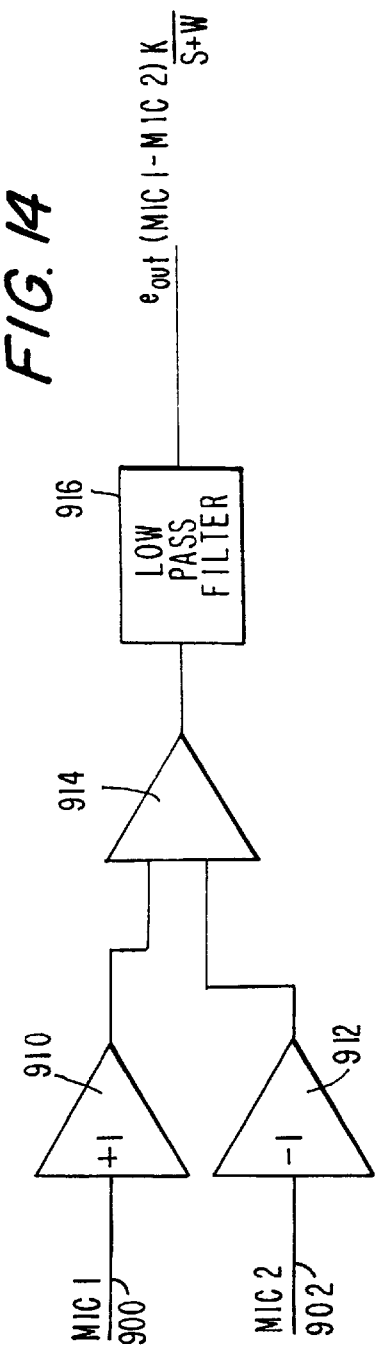
FIG. 14 is a schematic diagram of a directional microphone.

To insure that the near field response is the desired one, electrical circuit filters, such as the inclusion of a low pass filter 916 as shown in FIG. 14, allows only voice band frequencies $e_{(out)} = (mic_1 - mic_2)^k/_{s+w}$ to be present in the output and keep the restrictions on b and λ within practical constraints.

Figure 15:
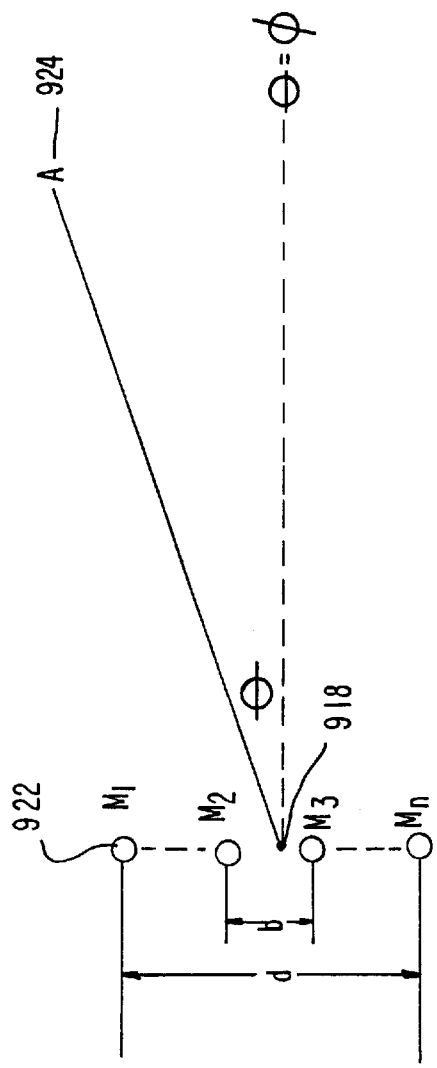
FIG. 15 is a schematic diagram of a linear array of microphones to which reference will be made in explaining the operation of an embodiment of the present invention.

If the number of elements is increased, and an array of microphones is implemented as shown in FIG. 15, the lobe patterns for cancellation/reinforcement is the side lobes (θ=90°, θ=270°) and the lobe patterns at θ=0° and θ=180° are increased, the greater the number of elements in the linear array, the sharper the θ=0°+θ=180° lobe patterns. FIG. 15 shows the microphones 922 uniformly spaced along the x-axis to facilitate analysis but spacing need not be uniform. The intermediate pair of elements $M_2$ and $M_3$ are spaced apart a distance b, and the outer pair of elements $M_1$ and $M_N$ are spaced apart a distance d. A sinusoidal wave is created when sound pressure is applied to the microphones and is incident of the array of elements or microphones. The direction of propagation of the wave creates an angle θ with the x-axis intersecting the same at point 918, midway between elements $M_2$, $M_3$. The amplitude of the wave (not shown) is a measure of the instantaneous sound amplitude 304 at that point. The distance d is the linear distance between a first microphone and nth microphone. These statements are based on similar microphones, and the use of appropriate electrical filters such that when r is not much greater than b, the electrical filter allows the microphone dipole to be mathematically manipulated for lobe construction. The concept of lobe construction is known to one skilled in the art.

Figure 16A:
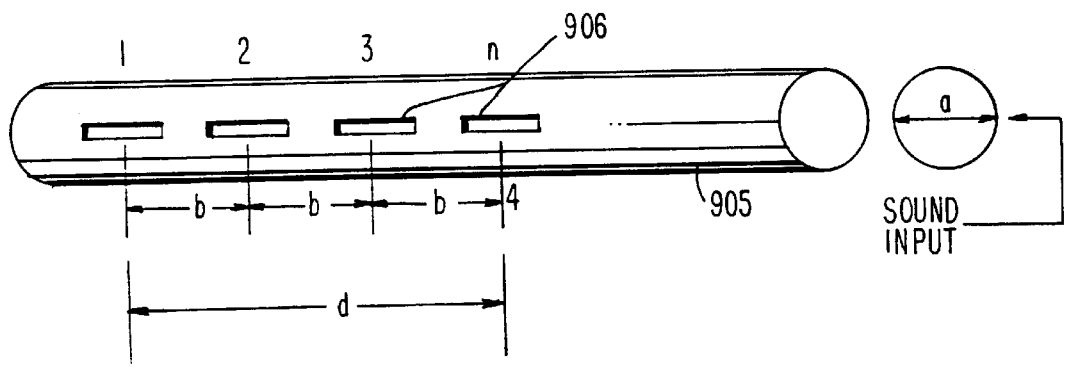
FIGS. 16A and 16B illustrate an alternative embodiment of the schematic diagram of an array of microphones in a cylinder and the schematic diagram of the electrical circuit array.

After the array has been utilized to adjust the receiving lobes to θ=0° and θ==180°, the 180° lobe will be greatly attenuated by placing the linear array into a cylinder as shown in FIG. 16A of radius $a/_2$, where the value of a is the sound input with the 180° side sealed physically with an inside sound absorbing pad 905 to prevent the production of any standing waves. Slots or apertures will be added in a plane parallel to the microphone array principal axis to insure the dipole action to oncoming acoustical signals is at θ=90° and θ=270°.

It should also be noted that the end microphones of the array, namely 1+n of FIG. 16A are displaced by a linear distance d along the axis of the cylindrical baffle 905, which acts as an acoustic resistance. Since this distance is large enough, the microphones are independent and causes a further enhancement of the sound along the θ=0° axis, which increases directionality.

Figure 16B:
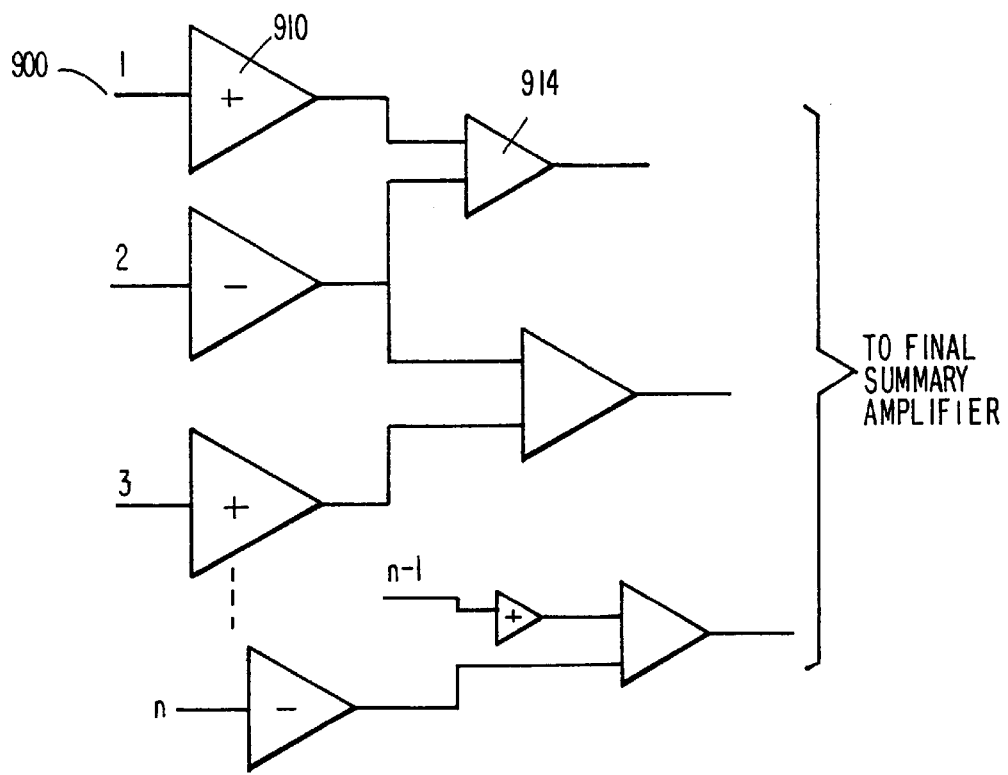

FIG. 16B is similar to FIG. 8 in that the differential amplifier is adapted to process a linear array of signals produced from microphones 900 to the nth microphone to an amplifier 910, with the output inputted to an summing circuit 914, where the output signal is transmitted to a final summing amplifier used in such circuits as described in FIGS. 7A to 13B. The output signal corresponds to substantially only speech from the user.

In FIGS. 10A and 10B, the circuit is similar to the circuits utilized in the telephone embodiments above-described with respect to FIGS. 1 to 5. In this circuit U1A is utilized for the subtraction, and U1B is utilized for output interfacing.

The phase reversing circuit is shown in FIG. 11. This circuit will provide two signals at points A and B 180 degrees out of phase with identical sound signals in microphones 1 and 2, if the microphones are matched parts (by manufacture). This output can be adjusted for amplitude matching at a reference frequency by adjustment of RA in conjunction with capacitor C. The signal at $e_{out}$ is the noise canceled output when the microphones are placed in the appropriate mechanical environment mentioned previously.

Analysis of the circuit of FIG. 11 can be shown to provide the following information. The output at A is at the Source of the internal FET contained within the microphone (preferably electret) such that its output is at an electrical angle of 0 degrees with the input pressure signal, while the output at B is from the Drain of the internal FET contained within electret microphone and its output is at an electrical angle of 180 degrees with the input pressure signal. When these two far field signals are summed together in a voltage mode, the output is zero if the amplitude is adjusted by potentiometer RA at a reference frequency and the magnitude response is flat across the frequency spectrum.

In the circuit in FIG. 12, the oppositely charged microphones provide two signals at A and B 180 degrees out of phase with identical sound signals at microphones 1 and 2. This phase reversal is accomplished by virtue of opposite charging during manufacture of the electret microphone condenser plates.

All of the other characteristics are as previously stated for the phase reversing circuit. Circuits of the type found in FIGS. 11 and 12 provide for electrical subtraction without the need for using an op amp.

In addition, the boom microphone/system of the invention is optimally defined by the location of the microphone's pressure surfaces, preferably 180 degrees in the case of the boom microphone, but cancellation will occur because of the subtraction type system defined in Figs. 10A–12 at all angles. In fact, when the microphone pressure surfaces are at 0 with respect to each other, total cancellation could be theoretically obtained but no audio signal would be transmitted. The system of the present invention can rely on the directivity patterns of the microphones in the near and far fields, orientation of their pressure sensitive surfaces, and the electrical process of subtraction.

The typical circuits that can be utilized for subtraction are shown in FIGS. 10A–12.

The boom microphone headset device of the invention (e.g. FIGS. 7A–13B) can provide for computer voice recognition. The boom microphone headset provides superior rejection of unwanted background noise and excellent voice response. The boom microphone headset can be configured to be compatible with all Sound Blaster™ audio cards. All other audio card interfaces are also easily accommodated.

The inventive boom microphone headset (e.g., FIGS. 7A–13B) coupled with the latest in high quality voice recognition software advances computer control with Voice to a reliability and user friendliness level equal to the keyboard and mouse. With the present invention, voice recognition is no longer confined to quiet closed door offices, but can be used in real-world noisy environments such as hotel lobbies, hospital emergency rooms, manufacturing facilities and noisy office areas. Thus, the boom microphone headset can interface with computers, telephones or other equipment in the real world or, the boom microphone (without headset) can be employed in various voice recognition applications.

The inventive boom microphone headset is designed to be sensitive to distance from the sound source. Arbitrary sound fields which emanate from more than a few inches away from the microphone are substantially canceled by up to 30 dB (3200%).

The inventive boom microphone headset preferably is connected to 3 meter cable which terminates in a 3.5 mm miniature plug (not shown). To connect it to the sound card, the user simply inserts the miniature plug into the Microphone input jack of the sound card (not shown). The inventive boom microphone headset then is placed on the user. The headset preferably has two features to help position the microphone in the proper position for reliable voice recognition: (1) adjustable temple pads on both the right and left sides and (2) an adjustable flex boom. The microphone at the end of the flexible boom preferably has a white or other color-coded dot indicating the voice-side of the microphone which should be adjusted to directly face the mouth. Proper close talking into the invention is helpful for accurate operation. Preferably the distance from the mouth to the microphone should be in the range of about ¼ to about ¾, preferably about ½ inch or less.

As to use with the Sound Blaster™, it is important to disable Automatic Gain Control (AGC) on the sound card before using the present invention in noise canceling applications. If AGC is ON, it will defeat the noise cancellation properties of the microphone by automatically turning up the input audio volume when the user is not speaking. The AGC can be disabled on Sound Blaster™ cards by running Creative Mixer™ and clicking on the AGC software control under "Recording Settings . . . ". The input audio gain is easily tailored to the target application using the Creative Mixer™ program. Testing of the inventive microphone headset can easily be performed by using the record and playback features of the Creative Labs Wave Studio™ program.

Figure 13A:
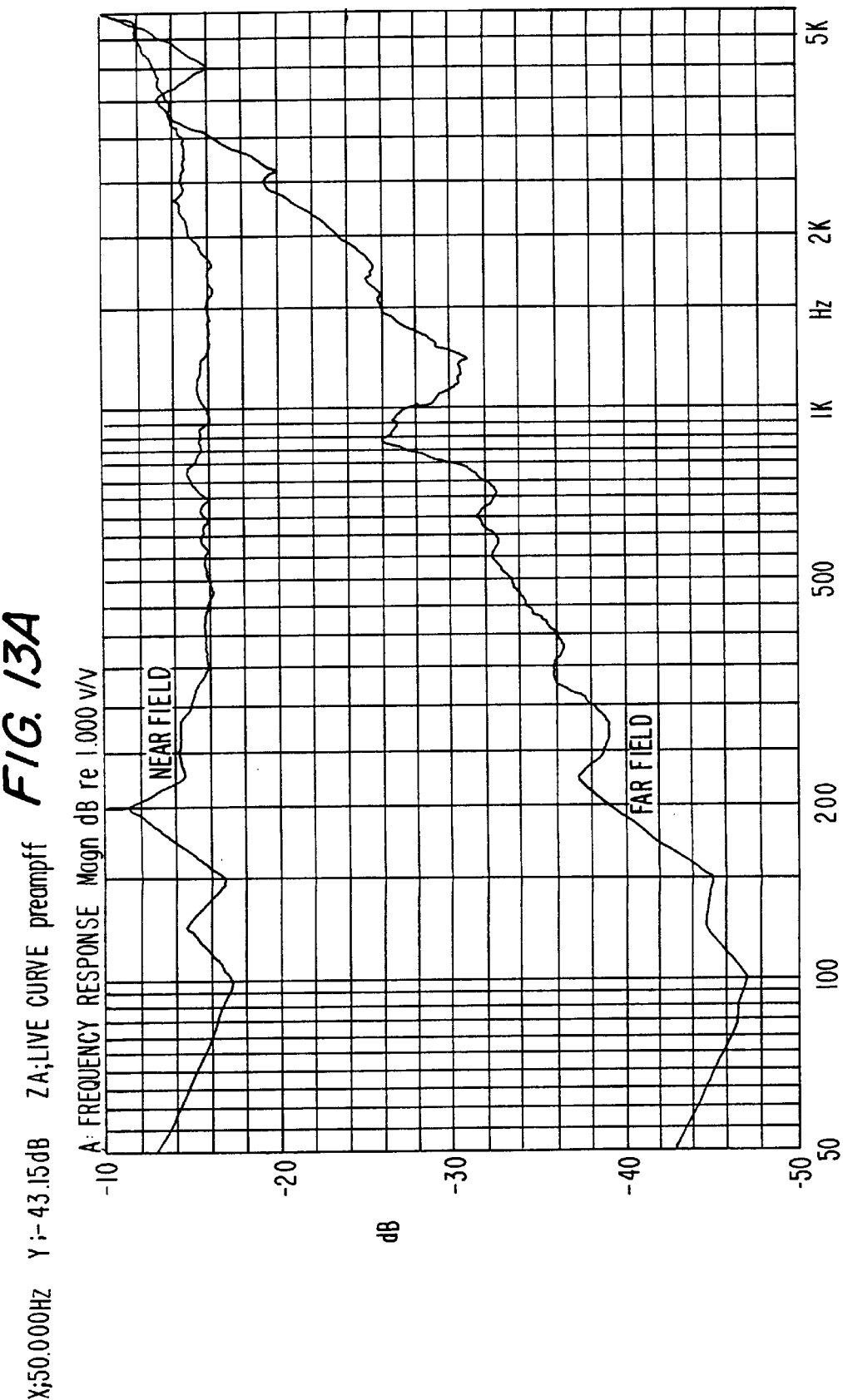
FIGS. 13A and 13B illustrate active cancellation curves from embodiments of the invention.
Figure 13B:
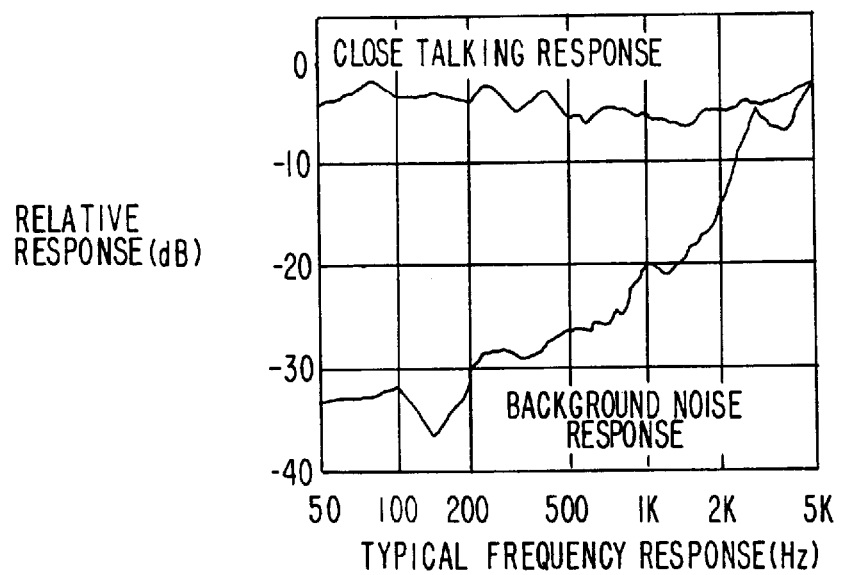

FIGS. 13A and 13B are active noise cancellation curves of the boom microphone in a headset embodiment with FIG. 13A, top line, representing near field response and FIG. 13A, bottom line, representing far field response. In FIG. 13B, the top line represents the close talking response and the bottom line represents the background noise response. Typical specifications for an embodiment of the inventive boom microphone headset include Frequency Resp: 20 Hz to 10 kHz
Output Impedance: Low Impedance (Capable of driving 560 ohm)
Sensitivity: −47 dB±2 dB (0 dB=1 v/Pa @ 1 kHz, 5V)
Operating Voltage: 2V to 10V
Current: <1 mA (power supply 5V)
Electrical S/N: 60 dB (minimum)
Noise Cancelation: See FIG. 13B
Cable Type: Non-detachable, shielded
Length of Cable: 3000±50 mm
Plug Type: 3.5 mm stereo miniature. male
Weight: 56 gm (without cable)
Using interpretation of speech intelligibility AI and ANSI S3.5-1969, a boom microphone headset of the invention and a standard (prior art) dynamic noise canceling microphone were tested and the results were as follows:

ARTICULATION INDEX: INVENTIVE BOOM MICROPHONE

| 1/3 Octave Band Center Freq. (Hz) | S/N (dB) [NPR-FPR] | Weight Factor (BW Corrected) | Articulation (1) Weight (W) |
|---|---|---|---|
| 200 | 26.6 | 0.00046 | 0.01219 |
| 250 | 24 | 0.0012 | 0.0288 |
| 315 | 22 | 0.0012 | 0.0264 |
| 400 | 20.5 | 0.0016 | 0.0328 |
| 500 | 17.5 | 0.0016 | 0.028 |
| 630 | 16 | 0.0023 | 0.0368 |
| 800 | 15 | 0.0023 | 0.0345 |
| 1000 | 12 | 0.0028 | 0.0336 |
| 1250 | 15 | 0.0035 | 0.0525 |
| 1600 | 9.5 | 0.0043 | 0.04085 |
| 2000 | 9 | 0.0044 | 0.0396 |
| 2500 | 5 | 0.0039 | 0.0195 |
| 3150 | 1 | 0.0039 | 0.0639 |

ARTICULATION INDEX: STANDARD (PRIOR ART) DYNAMIC NOISE CANCELLATION MICROPHONE

| 1/3 Octave Band Center Freq. (Hz) | S/N (dB) [NPR-FPR] | Weight Factor (BW Corrected) | Articulation (1) Weight (W) |
|---|---|---|---|
| 200 | 25.5 | 0.00046 | 0.01173 |
| 250 | 18 | 0.0012 | 0.0216 |
| 315 | 12 | 0.0012 | 0.0144 |
| 400 | 11 | 0.0016 | 0.0176 |
| 500 | 5.5 | 0.0016 | 0.0088 |
| 630 | 3 | 0.0023 | 0.0069 |
| 800 | 0 | 0.0023 | 0 |
| 1000 | 4 | 0.0028 | 0.0112 |
| 1250 | 3.5 | 0.0035 | 0.01225 |
| 1600 | 5 | 0.0043 | 0.0215 |
| 2000 | 2.2 | 0.0044 | 0.00968 |
| 2500 | 3 | 0.0039 | 0.0117 |
| 3150 | 2 | 0.0039 | 0.0078 |

Interpretation of speech intelligibility using AI and ANSI S3.5-1969 shows an accuracy level of 93% for the present invention versus an accuracy level of only 45% for the Standard Dynamic Noise Canceling Microphone. A comparison of this data reflects a reduction in error ratio of approximately 8:1 by the present invention (i.e., AI 45% std Dynamic Mic, Noise Canceling AI 93% by present invention). Furthermore, additional AI is expected when constants are corrected to be active down to 50 cycles and below. Literal evaluation of the AI calculation states that for every 100 words spoken, the present invention will commit 7 errors, and Standard Dynamic Microphones will commit 55 errors. All data and calculations were collected and performed at Andrea Electronics Corporation. Both microphone systems were tested at Andrea Electronics Corporation under the same conditions.

Figure 17A:
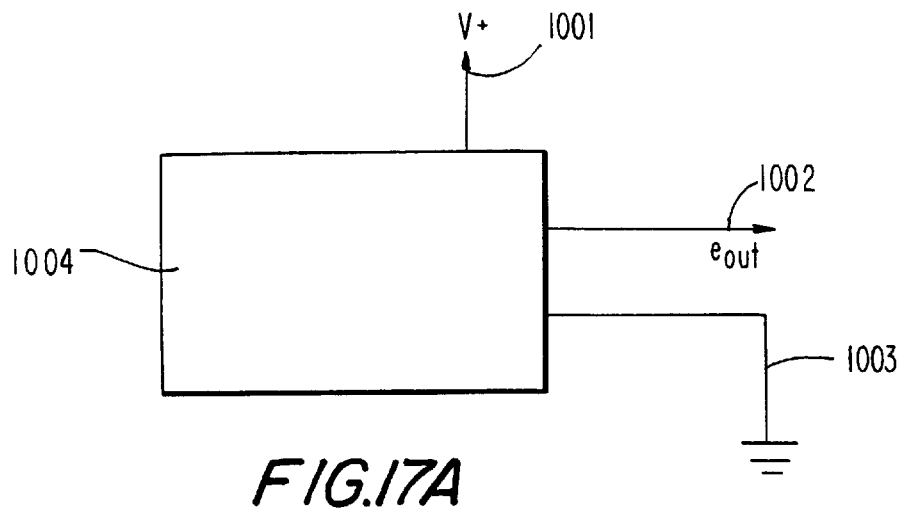
FIGS. 17A and 17B illustrate block diagrams of the prior art three terminal microphone configuration and a two terminal microphone configuration of the present invention.
Figure 17B:
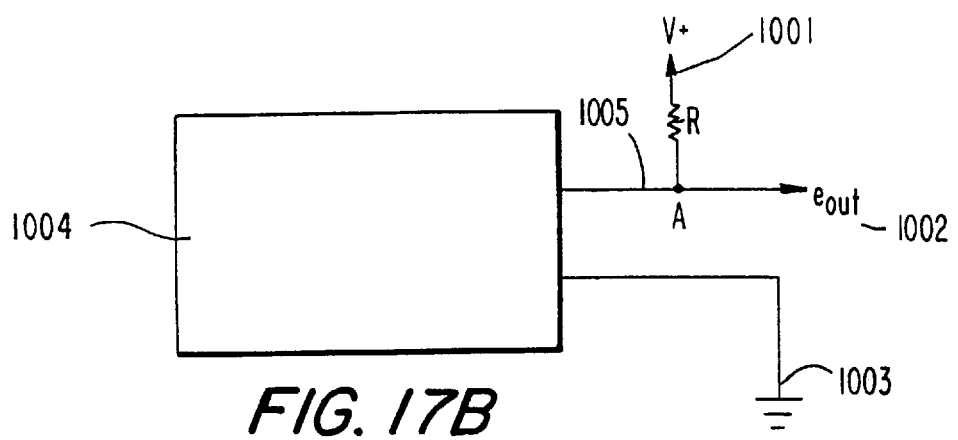

FIG. 17A shows a block diagram of a prior art amplifier plus a microphone 1004 having three terminal circuit configuration for outputting signals or power supply inputs from standard on-line power used in any type of microphone device, which includes an amplifier 1004 connected in telephone headset or the like. The three terminal configuration comprising a power input terminal 1001, a voltage output terminal 1005, and a ground terminal 1003. In an effort to reduce the simplicity of a signal processing circuit, the block diagram of FIG. 17B shows a microphone plus amplifier configuration of the present invention having a two terminal microphone. Terminal 1005 is adapted to receive the power input 1001, which is a DC signal received from a power supply, thru a resistor 1006 and transmits the audio output, an AC signal, on the same terminal, namely 1005, while terminal 1003 is grounded. Thus, at terminal 1005 the DC power is supplied for the active noise cancellation system described herein, and the audio signal generated by the microphone 1004 are concurrent. This point 1015 is the collector of transistor 1050 shown in FIG. 18.

Figure 18:
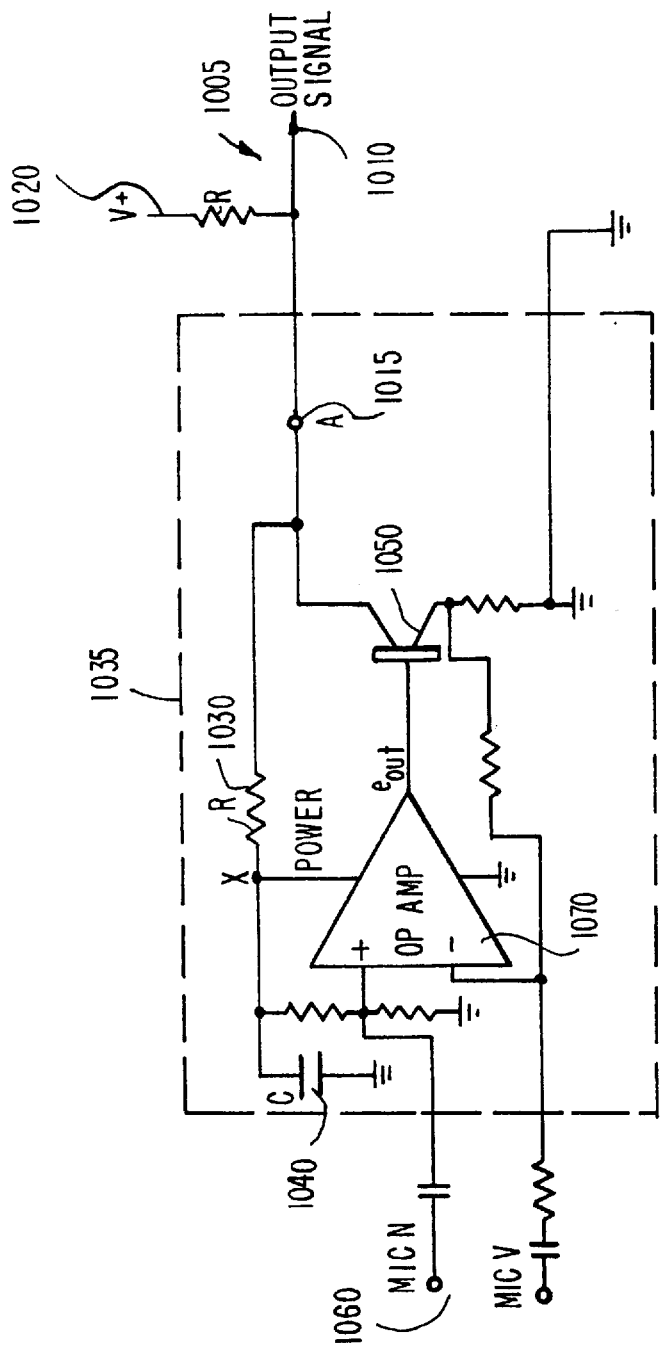
FIG. 18 is a schematic diagram of a simple two terminal microphone circuit.

FIG. 18 illustrates the basic circuit for processing signals obtained from the first and second microphones 12 and 14, respectively, so as to provide an audio signal output 1015 generated by the microphone signals 1060 outputted from the operational amplifier 1070, and a DC power inputted at terminal 1020 thru a resistor 1005, which signal and power being concurrent on the same terminal. That is, the audio signal is outputted and DC power is being supplied on the same terminal 1015. A method to separate the DC and AC at point 1035 is desired, which is preferably the resistor 1030 coupled with the capacitor 1040. The DC obtained at point 1035 is used to power the operational amplifier 1070 as well as the microphones 1060, and the terminal at point 1015 is used to output the audio signal. At point 1015, the audio signal is transmitted from the collector of a transistor 1050, and the AC signal is separated from the DC signal by resistor (R) 1030 coupled with the capacitor (C) 1040. This resistor coupled with the capacitor creates a low pass filter that provides the AC (audio) and DC (Power Separation), which filters the AC from the DC. The AC and DC signals at point 1015 are separated at point 1035 where only the DC is allowed to exists because of the filtering action of resistor 1030 plus capacitor 1040 arrangement. The audio output at point 1015 is generated by the AC signals of the microphones 1060. This separation is the preferred means for operation of the present invention due to the microphone subtraction that is required. At 1015, the AC signal from the input and the DC power are transmitted to the resistor 1030. The AC signal is then filtered out by the resistor 1030 coupled with the capacitor 1040, and the DC is used to power the circuit 1070. The audio signal, which is an AC signal is transmitted as an output signal at 1015.

Figure 19:
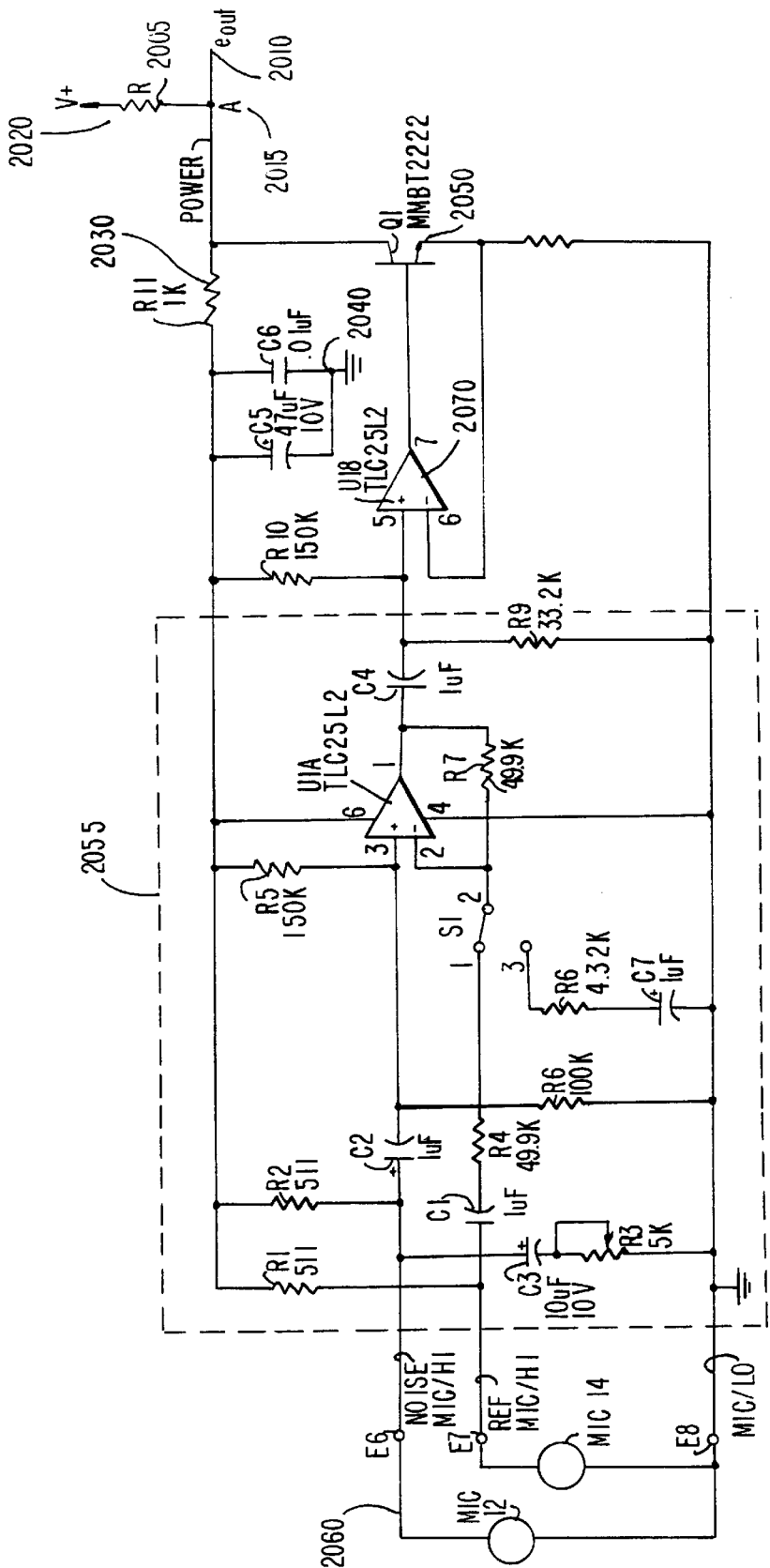
FIG. 19 illustrates a preferred embodiment of a two terminal microphone circuit used in an active noise cancellation system.

FIG. 19 illustrates a different embodiment of the two wire microphones where the power supply 2020 is inputted through resistor 2005 and the DC signal generated is transmitted on the same wire lead 2015. Therefore, the audio AC signal outputted by the collector of the transistor 2050 is superimposed on the dc signal at the same terminal at point 2015, the combination signal being supplied to resistor 2030. The AC component is then filtered out by the resistor 2030 coupled with the capacitor circuit 2040, with the remaining DC signal used to power the circuitry designated by 2055 including the operational amplifier 2070. The audio output signal transmitted at 2015 is generated by AC signals outputted by the two microphones 2060, and the signal is processed through the circuitry 2055 and the operational amplifier 2070, which understanding is apparent to those skilled in the art, and outputted at the same terminal at point 2015. This two-wire microphone circuit is more simpler than the prior three wire microphones circuitry, involving an input terminal, voltage output terminal, and ground terminal as shown in FIG. 17A. This two-wire microphone circuitry is utilized in any of the circuitry described in FIGS. 4–5, 10–12, where the signal is generated by at least two microphones. In addition, the two wire microphone circuitry is also utilized in the far-field directional microphones shown in FIGS. 14–16.

Figure 20:
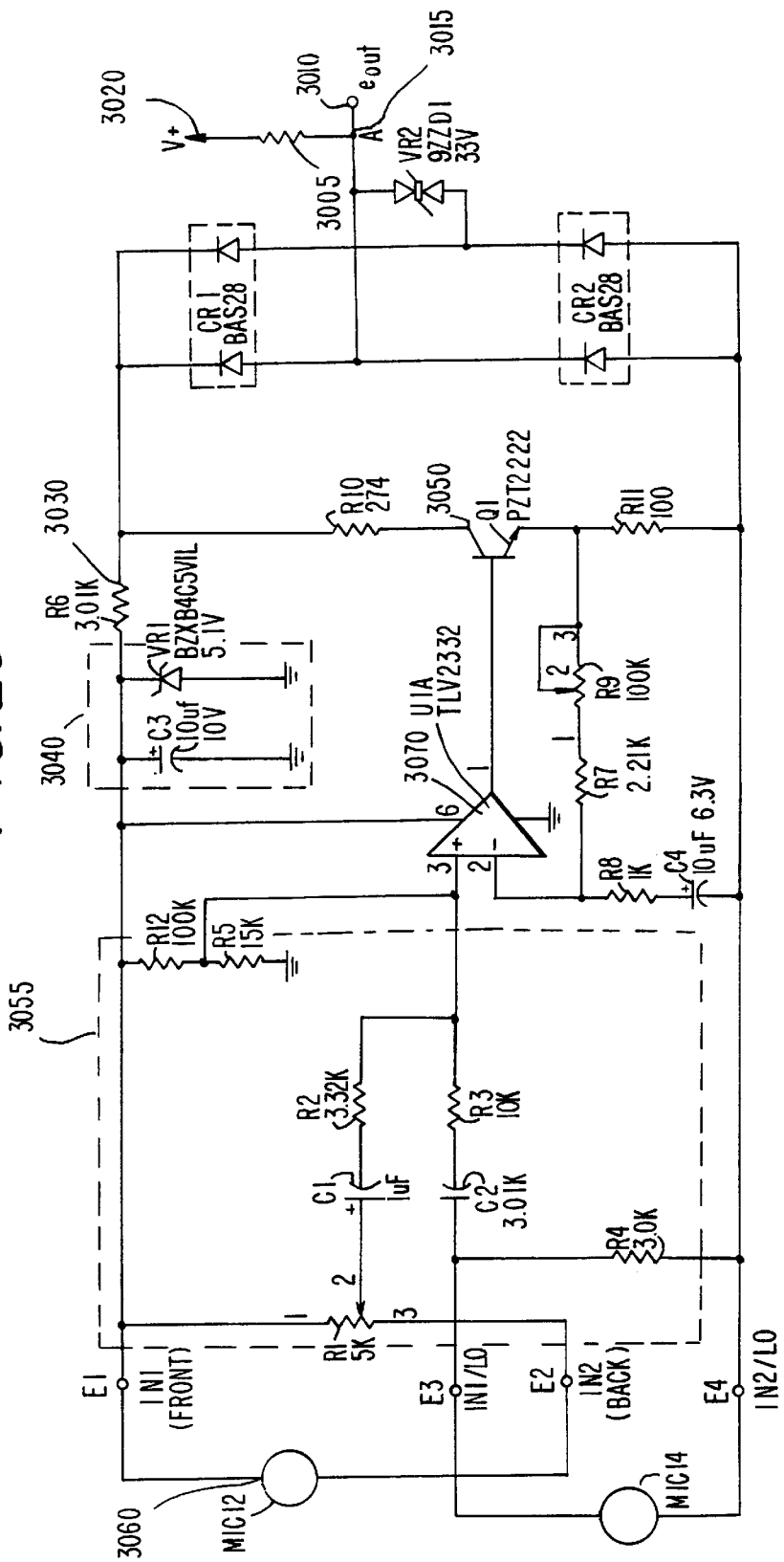
FIG. 20 is an alternative embodiment of a two terminal microphone circuit used in an active noise cancellation system.

FIG. 20 is an alternative embodiment of FIG. 19 employing a two-wire microphone circuitry, having the audio signal output and power input transmitted at the same lead terminal 3015. The AC signal generated by the collector of the transistor 3050 is outputted at same lead terminal 3015 as the DC power signal, which is generated by the power supply 3020 fed through the resistor 3005. Therefore, the AC signal is superimposed on the input DC signal at 3015, which combined (AC plus DC) signal is transmitted to resistor 3030. It is here that the AC component of the combined AC plus DC signal is filtered out by capacitor circuit 3040 coupled with the resistor 3030, with the DC signal remaining used to drive the remaining circuitry 3055 and the operational amplifier 3070, the understanding of this circuitry 3055 is apparent to those skilled in the art. The AC audio signal outputted by the microphone circuitry 3055 and 3070 is transmitted at the same terminal at point 3015 as the DC supplied for the active noise cancellation system described herein.

The individual circuit component without reference designations in FIGS. 19 and 20 are connected as shown and will not be discussed further, since the connections and values are apparent to those skilled in the art and not necessary for an understanding of the present invention.

Figure 21:
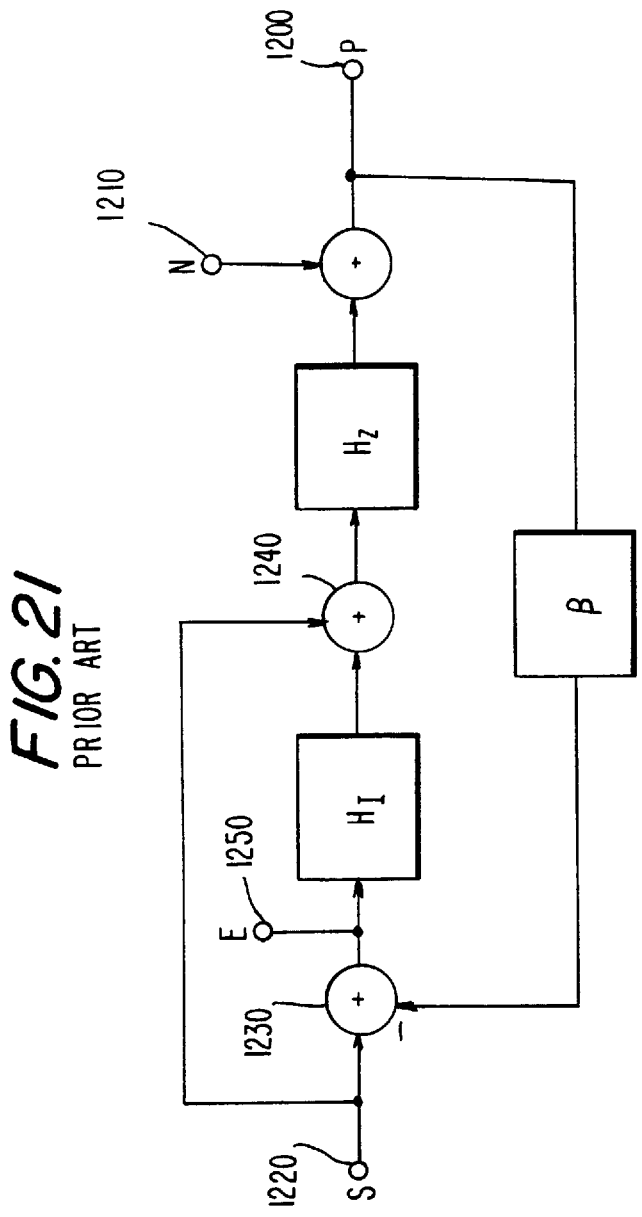
FIG. 21 is a schematic diagram of the prior art closed loop active noise reduction system.

FIG. 21 illustrates the closed loop system incorporated into the active noise reduction of the prior art. The governing equation is:

$$P = S\left(\frac{H_1H_2 + H_2}{1 + BH_1H_2}\right) + \left(\frac{1}{1 + BH_1H_2}\right)N$$

whereby P represents the audits sound pressure, S is the audio signal, $H_1$ is the high pass filter, $H_2$ is the speaker at the headset, B is the variable gain/phase control and N is the noise at the pickup microphone. The N noise component 1210 is zero at the P, pressure output 1200 because of the very large transmission gain $(1+BH_1H_2)$. In order that the desired S audio signal 1220 which is inputted as an electrical signal is not canceled, two summing nodes (1230, 1240) are added. The audio signal 1220 is inputted into two summing nodes (1230, 1240) to create the signal transmitted to the user ear. The first summing node 1230 adds the negative feedback signal to the desired input audio signal. However, the signal feedback from the microphone contains the desired audio signal as well as the ambient noise signal, the noise signal being the desired signal to be canceled. The feedback signal is subtracted from the desired input audio signal 1220 to create the anti-noise signal 1250, with no audio signal contained. A second summing node 1240 adds the audio signal 1220 into the loop to transmit to the speaker.

Figure 22:
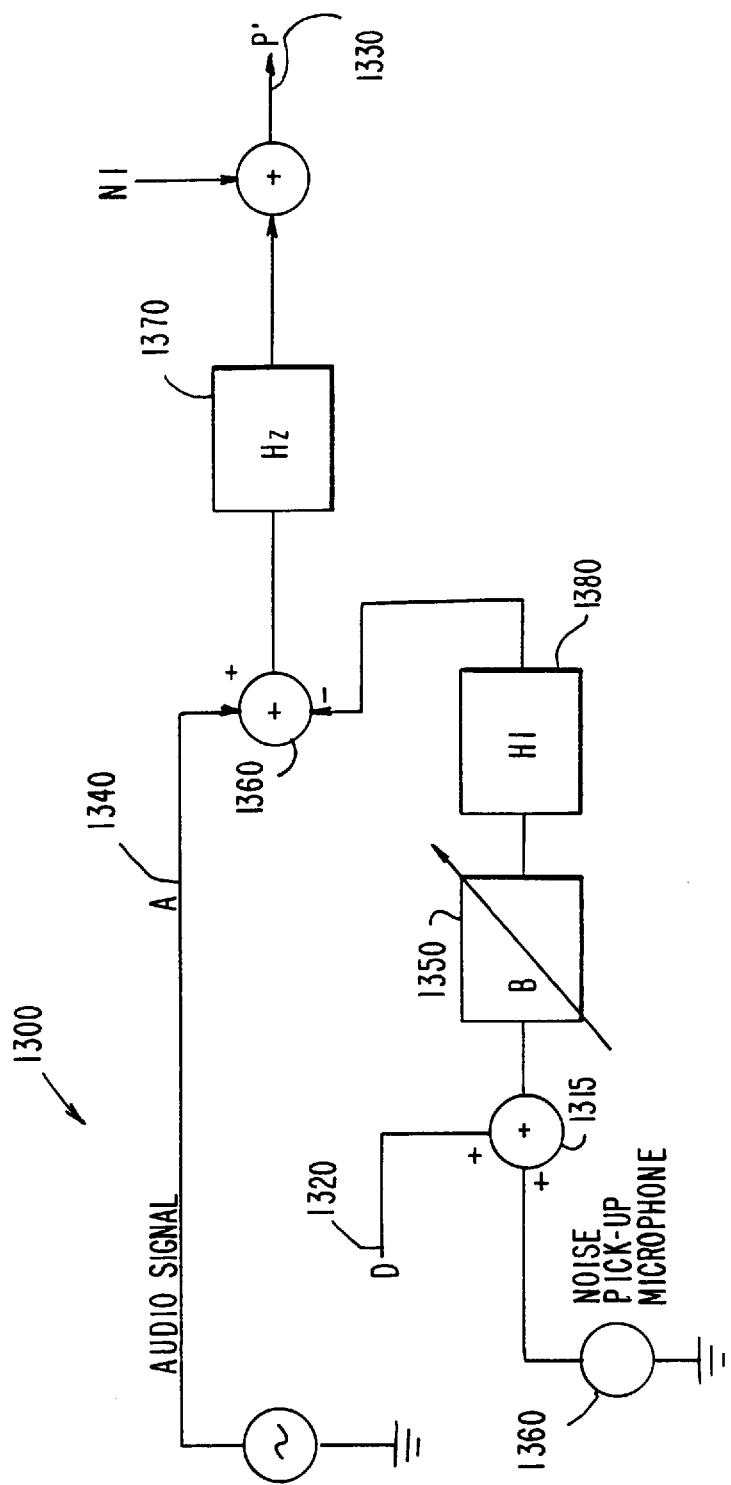
FIG. 22 is a schematic diagram of a open loop active noise reduction system of the present invention.

FIG. 22 relates to the active noise reduction system of the present invention, which is governed by the following equation $P=AH_2-(N+D)BH_1H_2+N_1$. In the equation, P represents the sound pressure 1330, A represents the standard audio transmission 1340; $H_2$ represents the speaker at the headset 1370; N is the noise at the pickup microphone 1315; D represents the very low frequency disturbance 1320; B is the variable gain/phase controller or calibration pot 1350; $H_1$ represents the high pass filter 1380 and $N_1$ is the noise 1390 at the quiet zone at the ear of the user. The active noise reduction system is comprised of an open loop circuit having the following components: an audio signal 1340; a sensor microphone 1310 able to detect and cancel noise 1315; a output transducer 1370 located near the user's ear; a variable gain/phase controller 1350 to adjust the amplitude of the anti-noise 1315; a summing node 1360 to sum the anti-noise signal and audio signal 1340; a high pass filter 1380 to prevent mechanical vibration induced frequency disturbance components 1320 from reaching the output transducer. The system detects ambient noise 1315 by the sensor or pickup microphone and applies electroacoustical processing to produce an acoustical signal for canceling out the ambient noise. This system may be used to cancel all noise, so as to obtain a signal representing speech, which is the desired signal to be heard through the ear of the user.

The active noise reduction system in FIG. 22 cancels noise at a specific point in space by sensing that noise 1315 with a sensor microphone 1310 and producing an anti-noise signal which is of the same magnitude but 180° out of phase with the input noise $N_1$ signal 1315. By adjusting the variable gain/phase controller 1350 to create an anti-noise signal of the same magnitude, but 180 degrees out of phase with the noise signal 1315, and summing the inputted audio signal 1300 and anti-noise signal at one summing node 1360 to yield an anti-noise plus audio signal, the ambient noise is attenuated without the input audio 1300 being degraded by mechanical or vibration induced microphone signals.

The variable gain/phase controller or calibration pot 1350 of the present invention remotely tunes or balances the sensor microphone to the output speaker in the headset or any other communication apparatus having an earphone with a microphone means to transmit intelligible speech. The controller or calibration pot balances the gain and phase of the frequency response of the noise signal detected from the pickup microphone 1310 to match the gain and phase of the noise component signal at a predetermined point in space. This point in space is in proximity to output transducer located in the earphone of the headset. Often the phase component of the noise signal is relatively flat due to the close proximity of the microphone to the output transducer, and the frequency response is linear to the output transducer. By independently calibrating the gain and phase microphone and signals in output transducer of the headset in an active noise reduction apparatus, to match the gain and phase in the earphone, a theoretical zero is yielded at a point in space, or a quiet zone. Basically, the ambient noise signal is inverted to an anti-noise signal by the adjusting the gain and phase to be canceled with a noise component located at a predetermined point in space, i.e. the quiet zone. The gain phase controller or calibration pot of the present invention provides for flexibility in the utilization of headsets with any communication system, i.e. flight controls system, computer interface, telephone network, or the like, as the headsets are readily adaptable for use in any communication system.

Therefore, the desired audio input signal 1340 is transmitted to the output transducer in the earphone without the disturbance of background noise. The output audio signal that reaches the ear of the user is of the formula $P=AH_2$, which is the desired audio transmission that was originally inputted to the headset or the like. The reduced complexity of the open loop design allows for all types of noise to be canceled, namely syndromes, repetitive, and transient.

The noise cancellation system 1300 described in FIG. 22 can be characterized as an open loop system without closed loop electrical feedback compensation. The system in FIG. 22 is capable of driving a speaker by employing a method of adjusting the parameters of the open loop system by the variable gain/phase controller 1350 and/or correct acoustic filtering of the sensing microphone. The preferably acoustic filtering is utilizing specifically selected foam, the most preferable is the Slo-Flo foam as shown in FIG. 23B. The positioning of the pick-up microphone 1310 relative to the speaker and the foam creates an acoustical waveguide 1400 as shown in FIG. 23A between the headset speaker 1370 or any other suitable speaker and the ear of the user. This microphone positioning channels the desired audio signal to the user ear canal and isolates any audio signal generated from the noise detected by the pickup microphone 1310. The pickup microphone 1310 is preferably placed outside the plane of the speaker and outside the acoustic waveguide, but close in distance to the ear canal of the user where the quiet-zone field as described in FIG. 24 is created. The quiet zone in FIG. 24 maintains phase agreement between the noise signal picked up by the microphone and the anti-noise signal located in the acoustical waveguide, located behind the speaker. The present invention is not concerned with the microphone and speaker being in substantially the same plane. They may be in the same plane; but, they do not need to be in the same plane. Rather, the noise reducing device of the present invention is concerned with creating an acoustical waveguide by use of acoustic filters between the device speaker and the ear of the user, for channelling the audio input signal to the user's ear canal without disturbance from any noise detected by the pickup microphone 1310, which has been canceled. No noise cancellation may occur when the phase difference is 90 degrees, or ¼ wavelength and reinforcement would occur at 180 degrees or ½ wavelength. The equation that governs this distance is:

$$\phi = \frac{lf360}{v}$$

where $\phi$=phase at specific frequency l=distance f=frequency v=speed of sound (in/sec)

The H1 transfer function 1380 of the open loop equation as shown in FIG. 22 is a high pass filter. Over the frequency range, the high pass filter is active at H1=1, and is inactive at H1≈0. The purpose of the high pass filter 1380 is to reject the low frequency mechanically induced transients in a regular manner so that the active noise reduction performance is continued in a regular manner, but not used as a lead stabilization network as in the standard closed feedback systems. In the open loop equation governing the present invention in FIG. 22 is the placement of the breakpoint, which provides optimum performance of the device. The breakpoint is where the amplitude goes from zero (0) to the leading edge of the pass band. In the frequency range below the breakpoint, H1≈0 and the product (D×H1)=0. The adjustment procedure is then as follows:

P=AH2−(N+D)BH1H2+N1 becomes

P=AH2−NBH1H2+N1 if

NBH1H2=N1 by B adjustment

P=AH2, which is desired Audio Signal.

Above the breakpoint, H1=1 and D=0. The product H1D=0 and by similar reasoning, P=A×H2, the desired audio signal. The correct placement and slope of the breakpoint transition provides for the most preferred active noise reduction and optimum disturbance performance. Due to the inherent stability of an open loop system, the mechanical and vibration low frequency signals can be electrically filtered out without adding significant complexity to the circuitry and having to deal with closed loop stability requirements.

Measurements of the transfer function of FIG. 22, have shown that the open loop concept is in embodiment of the present invention. The transfer function from N to P has shown a magnitude of less then 1, and if the system was closed loop with G=1, H=1 system the maximum cancellation is 50%.

$$CLTF = \frac{e_{out}}{e_{in}} = \frac{G}{1+GH} \text{ if } GH < 1 \text{ } G < 1$$

$$\frac{e_o}{e_{in}} \cong \frac{1}{1+1} = \frac{1}{2}, \text{ or } e_o = \frac{1}{2} e_{in}$$

An open Loop system in fact would approach 100% cancellation under these conditions.

There is no need to add a second summing node in the present invention as shown in FIG. 22. However, the prior art closed loop noise cancellation systems double adds the audio to reduce the effect of pick-up microphone subtraction as detailed in FIG. 21. The present system shows no audio reduction with only a single audio summation node 1360 in FIG. 22, as the present invention is concerned with canceling only noise detected by the microphone 1310 and the microphone is independent from the audio signal being transmitted to the speaker for obtaining the desired audio signal 1340.

A mechanical diagram of the active type noise cancellation device of the present invention is shown in FIGS. 23A and 23B. The acoustic waveguide 1400 shown in FIG. 23B, may perform anyone of the functions of 1) channeling sound between speaker 1410 and user ear 1430 and 2) isolation of sound emanating from the speaker/quiet-zone 1440 at the user's ear 1430 to the noise pickup microphone 1420 at the edge of the speaker. Elements of the mechanical design of the present device may be any of 1) close distance between the noise pickup microphone and anti-noise signals, 2) placement, orientation and isolation of the microphone to minimize microphone sensitivity lobe patterns in the direction of the speaker sound field, 3) use of an acoustic filter or baffle 1440, such as the preferred foam, Slo-Flo, but other suitable material may be used to create the acoustical waveguide. The acoustical waveguide isolates the noise pickup microphone from the speaker as shown in FIG. 23A to create the quiet-zone 1440 in front of the user's ear as shown in FIG. 23A for increased speaker efficiency. The acoustical waveguide acts as a receiver for the anti-noise signal, generated from the signal processing means of the electrical signals from the microphone. This anti-noise signal creates the quiet zone of the acoustical waveguide. The device with acoustic waveguide can be applied to headphones of all types including open back, that is, no ear passive earcups, or closed back type headsets, that is with passive noise attenuation earcups or any other suitable headsets utilizing a receiver and transducer.

FIG. 24 is an evaluation of a quiet zone in space whereby the first vector 1500 is the noise vector and the second vector is the anti-noise vector 1501 produced by the active noise reduction system of the present invention. The two vectors create an angle θ, which phase and magnitude is attenuated by the variable gain/phase controller, thereby controlling and thereby reducing the anti-noise processing induced distortion of the desired electrical input signal; which is converted to an acoustic signal and transmitted to the ear of the user.

Figure 25:
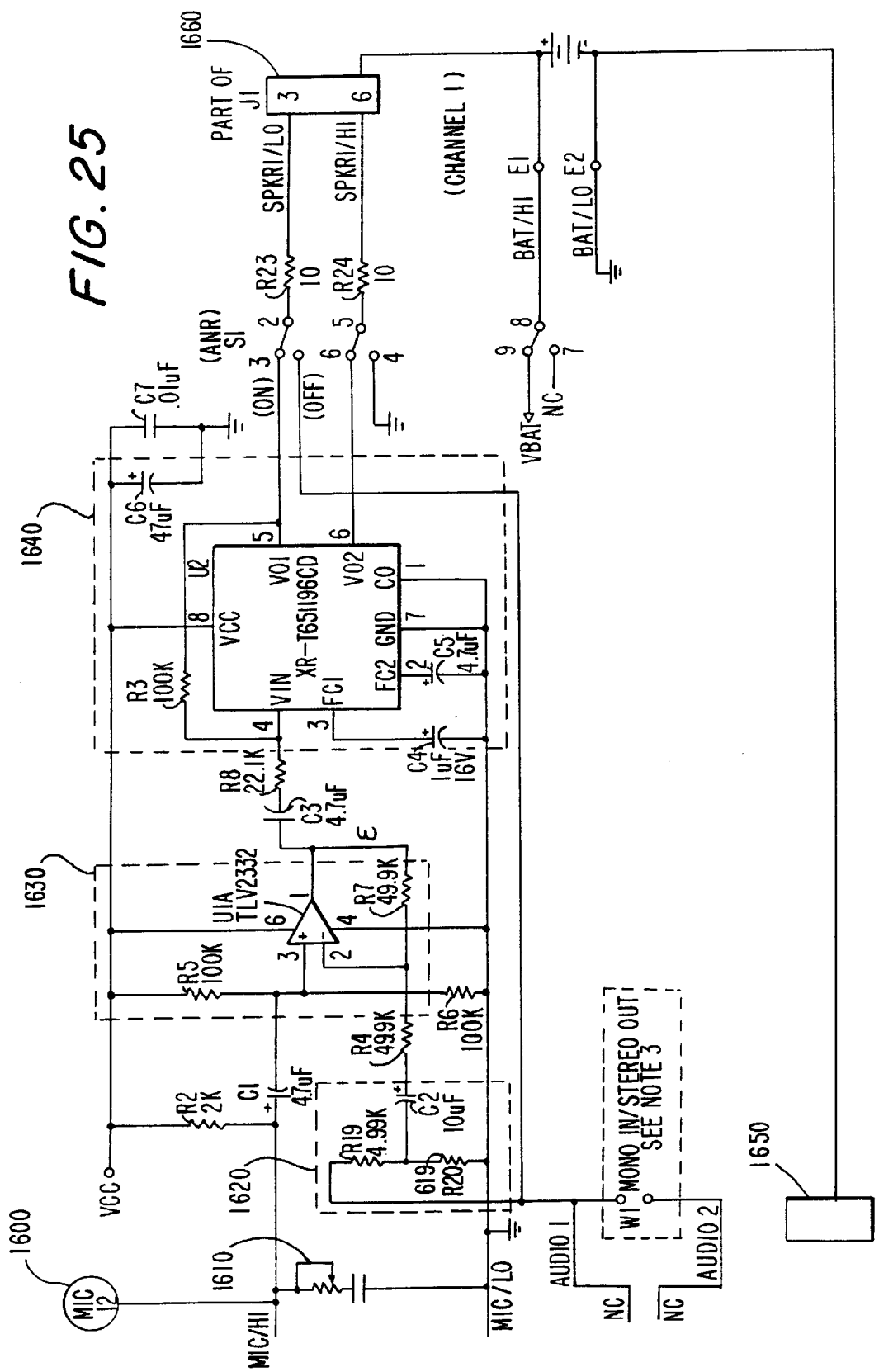
FIG. 25 illustrates a preferred embodiment of an active noise reduction system of the present invention.

FIG. 25 illustrates a schematic diagram, which embodies the active noise reduction system described in FIG. 22. The schematic diagram comprises a pickup microphone 1600, a speaker 1650, a variable gain/phase controller 1610, an signal convertor 1620, a summing amplifier 1630, a power amplifier 1640, an anti-noise output signal 1660. A standard audio signal 1605 is inputted to the user of the headset. The sensor pickup microphone 1600 detects ambient noise and creates an electrical signal. This signal is inputted into an electro-acoustical processing unit, which is comprised of the variables gain/phase controller 1610, the signal convertor 1620 and the summary amplifier 1630 to produce an acoustical signal for canceling out the ambient noise, referred to as an anti-noise signal outputted at 1600. This anti-noise signal is placed in front of the speaker at some point in space to achieve a quiet zone as shown in FIG. 24. The desired input audio signal 1605 is isolated or disposed from the microphone, hence, the input audio signal is not associated with the ambient noise detected by the pickup microphone 1600. The original input audio signal 1605 is able to be transmitted through the speaker into quiet zone, without noise disturbance. Therefore, in the open loop system of the present invention, the audio input signal generated in the active noise reduction system is not disturbed by the ambient noise, which noise is detected and reduced by the sensor pickup microphone circuitry comprising: the variable gain adjustor 1610, the communication audio 1620, the summing amplifier 1630 and the power amplifier 1640. Hence, the audio input signal 1605 does not have to be double added as required in a close loop system.

Figure 26:
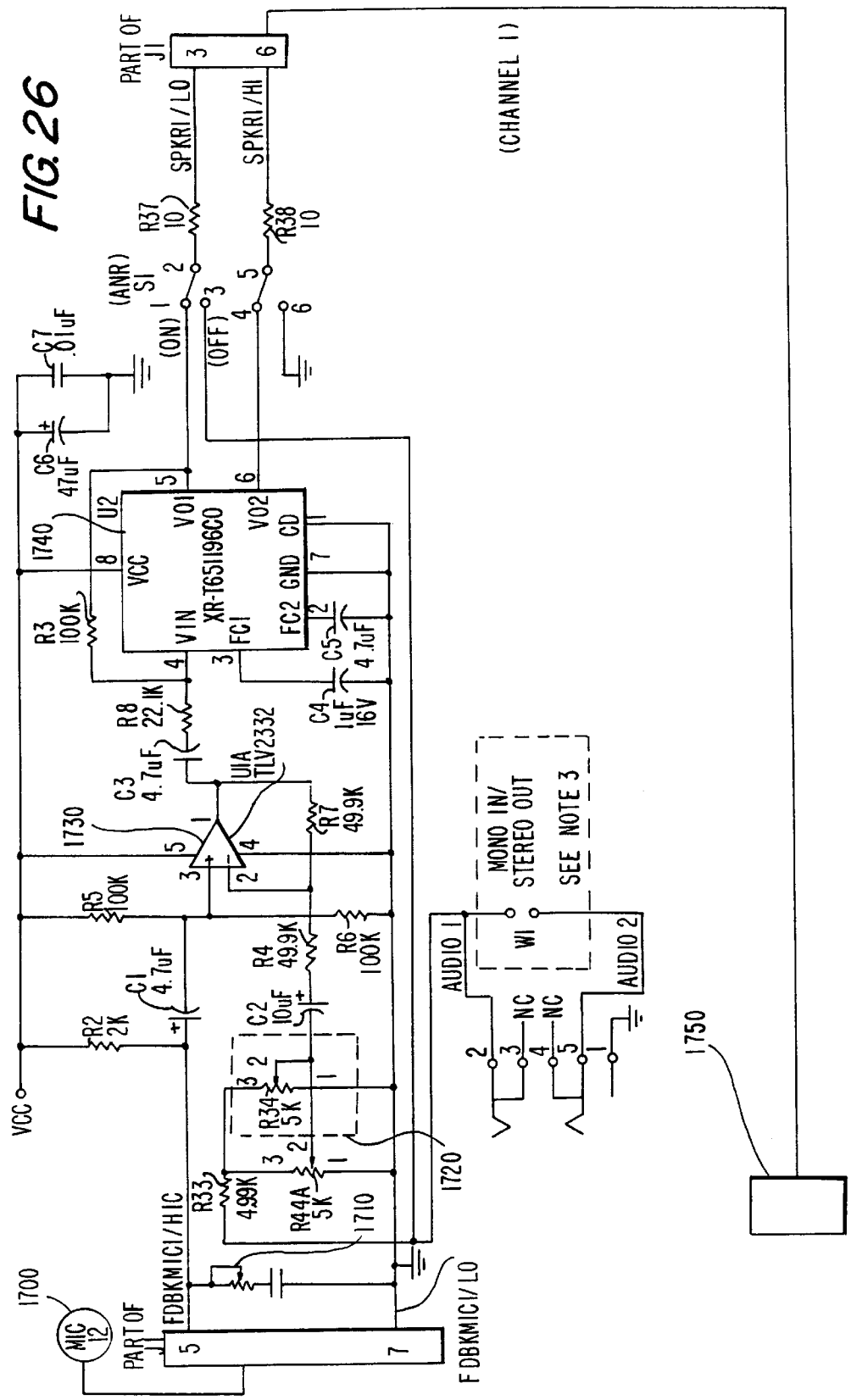
FIG. 26 illustrates another preferred embodiment of an active noise reduction system of the present invention.

FIG. 26 illustrates a different embodiment of FIG. 25 which incorporates an open loop system for active noise reduction by using a sensor pickup microphone 1700, a variable gain/phase controller or calibration pot 1710, communication audio signal 1720, a summing amplifier 1730 and a power amplifier 1740, and speaker 1750. The operation of this circuit is described in FIGS. 22 and 25.

Figure 27:
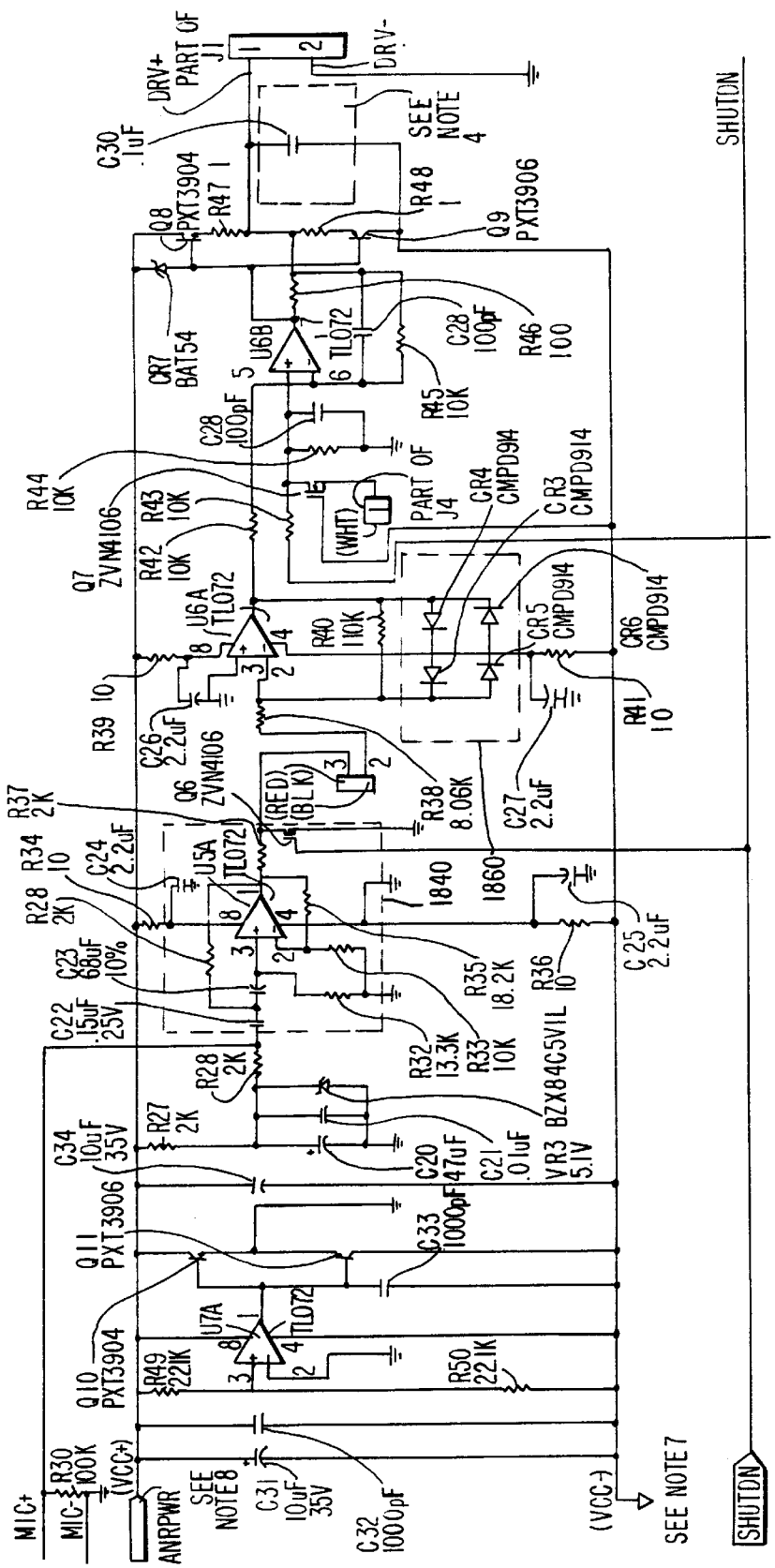
FIG. 27 illustration alternative embodiment of the active noise reduction system of the present invention including a high pass filter.

FIG. 27 is a preferred embodiment of FIG. 25 with a high pass filter circuit 1840 added to the active noise cancellation system to reject on a regular basis the low mechanically induced transients so not to interfere with the active noise reduction performance. The high pass filter circuit 1840 is not to be used as a lead stabilization network as in the standard feedback system. FIG. 27 also contains a saturation reduction 1860 for clipping diodes. The function of the clipping diodes in FIG. 27 is to prevent the output transducer from reaching its physical limits. That is, it limits the amplitude of the signal inputted to the transducer to prevent the speaker or output transducer from exceeding its physical excursion.

The individual circuit component without reference designations in FIGS. 25–27 are connected as shown and will not be discussed further, since the connections and values are apparent to those skilled in the art and not necessary for an understanding of the present invention.

Figure 28:
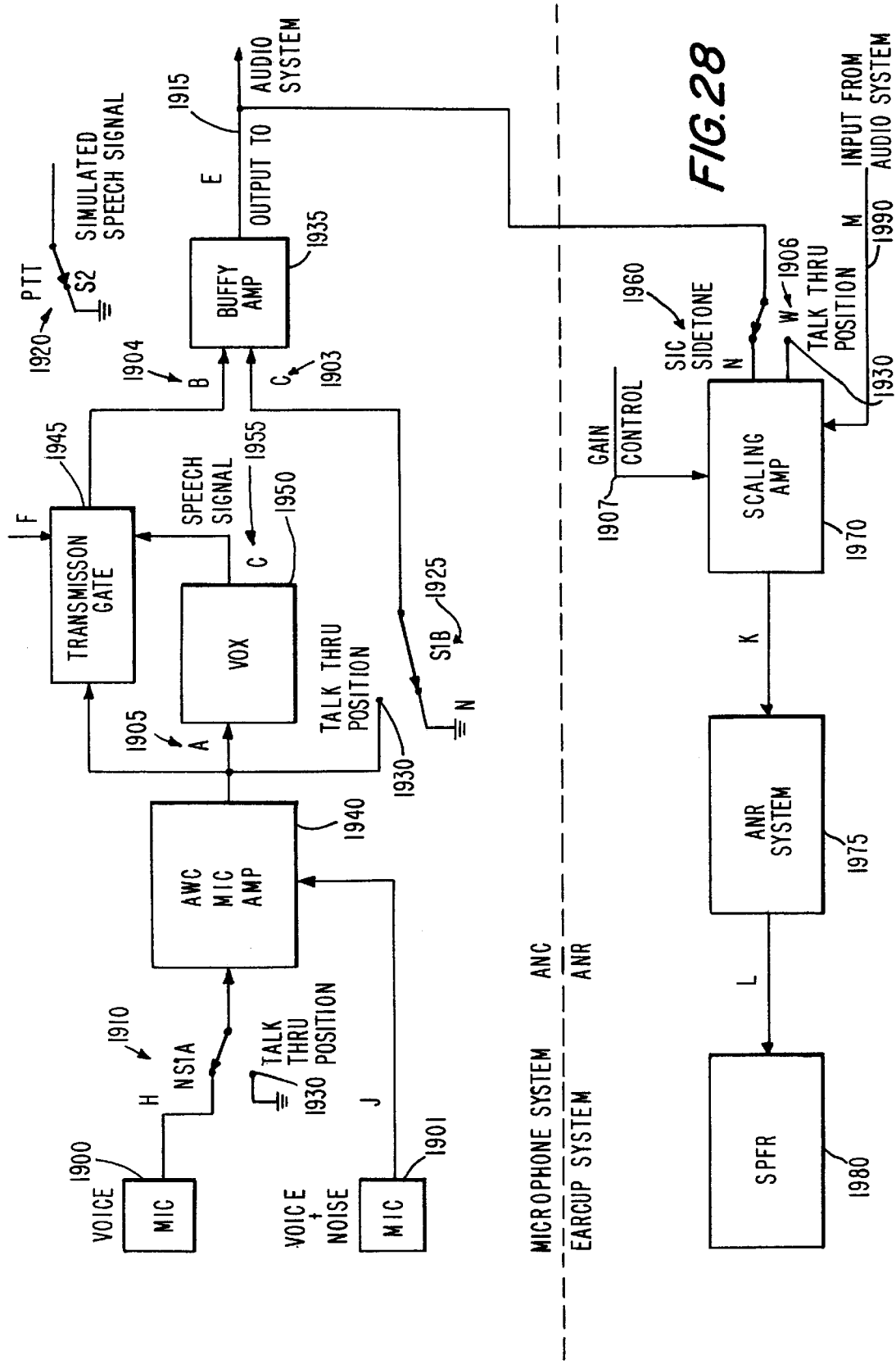
FIG. 28 is a block diagram of the active noise reduction and noise cancellation system utilized in a headset having the talk thru, sidetone, and automatic audio microphone transmission features.

FIG. 28 is an enhancement of the active noise cancellation and noise reduction system utilized in a headset having a "talk-thru" capability.

The enhancement in FIG. 28 is achieved by including the following features: an automatic audio microphone transmission in the active noise cancellation system to sense speech ("VOX circuit") 1950, the ability to transmit a portion of the received microphone signal to earcup of the speaker ("sidetone circuit") 1960, 1907, 1970 and 1930, the capability of converting an active noise cancellation microphone to a standard omni- directional microphone by removing the voice microphone from the circuit, and increasing the gain of the noise microphone amplifiers ("talk thru") 1930. With the "talk thru" feature, all audio (1990) from the external area is transmitted to the earcup speakers 1980 by an increased gain sidetone channel 1907. The enhanced active noise cancellation and noise reduction headset in FIG. 28 comprises: active noise cancellation microphone 1900 that detects only the audio signals and active noise cancellation microphone 1901 that detects the audio signal and background noise; a first S1A switch 1910 having a noise canceling mode and talk-thru mode or position; a second S1B switch 1925 having a noise canceling mode and a talk-thru mode; a third S1C switch having a noise canceling mode and a talk-thru mode; a Push to Talk (PTT) switch 1920 having a hot mike position and simulated speech signal mode; active noise cancellation microphone amplifier 1940; VOX circuit 1950, speech signal 1955; transmission gate 1945; buffer amplifier 1935; audio system 1915; scaling amplifier 1970 having a gain control function 1907, a sidetone signal 1960 inputted at 1906; earcup speaker 1980; external audio system 1990; and an active noise reduction system as preferably described with respect to and shown in FIGS. 21–24. This headset in FIG. 28 operates in either a noise canceling mode or a talk-thru mode.

In the noise canceling mode, the switch S1 is in the "N" position 1910, and the active noise cancellation microphones 1900 and 1901 are operating as previous described herein. The PTT switch (Push to Talk) 1920 is not activated in the noise canceling mode. The VOX circuit 1950 which is connected to the microphone output of the microphone amplifier 1940 at A 1945 monitors the microphone output signal of the amplifier 1940. The VOX comprises an attack time (turn "on time" averaging circuit of audio), and a release time (turn "off time" averaging circuit of audio) which is adjusted to minimize response to spurious signals and to keep the microphone "on time" to a minimum in the noise canceling mode. This in reality will increase the system's speech to noise ratio "S/N". When the VOX 1950 has determined that the signal at the output of the microphone is useable audio, it will activate the "speech signal" at point C 1955, which will enable the transmission gate 1945 and allow the microphone audio outputted from the active noise cancellation microphone amplifier means 1940 into the buffer amplifier 1935 and then to the audio system at E 1915. In addition, this audio 1915 is sent to the scaling amplifier 1970 at W 1906 to provide a sidetone signal to the earcup speakers 1980 when the third switch S1C 1960 is at N, the noise canceling mode. The scaling amplifier 1970 can also simultaneously accept an input from an external audio system 1990, i.e. distinctive sounds from the surroundings, such as sirens, bystander's voices, or other external sounds not being transmitted by the microphones 1900 and 1901. The composite signal at the earcup speaker 1980 is the linear addition of sidetone 1960 and external audio 1990.

In the talk-thru mode, switch Si is placed in the talk-thru mode or position shown as 1930 for the first, second and third switches (1910, 1925, 1930). The voice microphone 1900 is disabled. The voice and noise microphone 1901 is enabled. The microphone amplifier 1940 output at A 1905 is the noise omnidirectional microphone 1901 output. In the talk-thru mode, the VOX circuit 1950 is bypassed by the second S1B switch 1925 placed in the talk thru position, which allows the direct output of the noise omnidirectional microphone signal 1901 to the buffer amplifier 1935 at D 1903 and then outputted to the audio system 1915 at E. As a result, no speech signal is inputted to transmission gate 1945 output at B 1904 because the gate 1945 is disabled. The gain control function 1907 of the scaling amplifier 1970 is increased at W 1906, by the action of switch S1C 1960, at the talk thru position 1930. Thus, the sidetone signal outputted from the active noise reduction system (described in FIGS. 21–27) is increased at the speaker 1980.

As a result of the arrangement described in FIG. 28, and without the physical addition of any other microphone elements, a talk thru feature has been added to the headset described with respect to and shown in FIG. 9–27. This allows audio transmission of voice to be heard in the earphone speaker 1980 without removal of the headset. This enhancement provides the headset user the option to continuously wear the headsets to receive the audio transmitted from the microphone signals, as well as any other distinctive external noise in the surrounding environment. This external noise can be any sounds, such as explosions, emergency sirens or bystanders speaking to the headset user. The enhancement avoids the awkwardness and inconvenience encountered in removing the headset constantly throughout the day to hear external noises not being internally communicated thru signals in the headset. The user now is able to hear internal audio signals and external audio from the surrounding environment while wearing the active noise reduction and noise cancellation apparatus described with respect to and shown in FIG. 28.

Further, although the above-described embodiments of the present invention have been described for use with telephone handsets and boom microphones and the like, the present invention is not so limited and may be used with numerous other devices such as intercom systems, telemetry, acoustic surveillance microphones, directional microphones and so forth. Further, the invention can be utilized in voice recognition and/or verification systems such as systems for access to physical facilities, computer programs, computers or automatic teller machines and the like. Additionally, the present invention may be used with processing devices operating in accordance with predetermined processing algorithms, as described in U.S. Pat. No. 5,251,263, which has a common assignee with the present application, and which is hereby incorporated by reference; however, such is not believed necessary to the invention.

Furthermore, although preferred embodiments of the present invention and modifications thereof have been described in detail herein, it is to be understood that this invention is not limited to those precise embodiments and modifications, and that other modifications and variations may be affected by one skilled in the art without departing from the spirit and scope of the invention as defined by the appended claims.

What is claimed is:

1. A method for independently calibrating an open loop active noise reduction apparatus including a housing comprising a speaker to produce an acoustic anti-noise signal in the housing, a microphone to detect an external noise signal, an acoustical waveguide having zero phase shift over a desired bandwidth to isolate and direct the acoustic anti-noise signal from the microphone, and an amplitude adjustment means to calibrate the acoustic anti-noise signal to create a quiet zone in the housing for operation with an independent electrical assembly, wherein the apparatus is calibrated separately from the electrical assembly, the method comprising the steps of:

producing the external noise signal having a gain and phase response detected by the microphone in the housing;

inputting an external noise signal received by the microphone through acoustic-electra processing means in the electrical assembly to produce an electrical anti-noise signal;

transmitting to the speaker the electrical anti-noise signal having an equal gain and opposite phase response to the external noise signal detected by the microphone; and balancing the gain and phase response of the electrical anti-noise signal by the amplitude adjustment means located in the noise reduction apparatus to match the gain and phase response of the external noise signal to yield a theoretical zero in the quiet zone.

2. The method in claim 1, wherein said step of balancing adjusts a calibration pot to balance the gain and phase response of the electrical anti-noise signal.

3. A method for independently calibrating an active noise reduction apparatus including a housing comprising a speaker to produce an acoustic anti-noise signal in the housing, a microphone to detect an external noise signal, an acoustical waveguide having zero phase shift over a desired bandwidth to isolate and direct the acoustic anti-noise signal from the microphone, and an amplitude adjustment means to calibrate the acoustic anti-noise signal to create a quiet zone in the housing for operation with an independent electrical assembly, wherein the apparatus is calibrated separately from the electrical assembly, the method comprising the steps of:

inputting an external noise signal received by the microphone through acoustic-electro processing means in the electrical assembly to produce an electrical anti-noise signal;

transmitting to the speaker the electrical anti-noise signal having an equal gain and opposite phase response to the external noise signal detected by the microphone; and balancing the gain and phase response of the electrical anti-noise signal by the amplitude adjustment means located in the noise reduction apparatus to match the gain and phase response of the external noise signal to yield a theoretical zero in the quiet zone.

4. The method in claim 3, wherein said step of balancing adjusts a calibration pot to balance the gain and phase response of the electrical anti-noise signal.

5. The method in claim 3, wherein said active noise reduction apparatus is an open loop active noise reduction apparatus.

* * * * *